(12) United States Patent
Sunaga et al.

(10) Patent No.: US 10,035,889 B2
(45) Date of Patent: Jul. 31, 2018

(54) OPTICAL FILM

(71) Applicants: Mitsui Chemicals, Inc., Minato-ku, Tokyo (JP); Keio University, Minato-ku, Tokyo (JP)

(72) Inventors: Tadahiro Sunaga, Yamato (JP); Takashi Oda, Ichihara (JP); Yasuhiro Koike, Yokohama (JP)

(73) Assignees: MITSUI CHEMICALS, INC., Minato-Ku, Tokyo (JP); KEIO UNIVERSITY, Minato-Ku, Tokyo (JP)

( * ) Notice: Subject to any disclaimer, the term of this patent is extended or adjusted under 35 U.S.C. 154(b) by 269 days.

(21) Appl. No.: 14/782,049

(22) PCT Filed: Mar. 25, 2014

(86) PCT No.: PCT/JP2014/058339
§ 371 (c)(1),
(2) Date: Oct. 2, 2015

(87) PCT Pub. No.: WO2014/162928
PCT Pub. Date: Oct. 9, 2014

(65) Prior Publication Data
US 2016/0032063 A1 Feb. 4, 2016

(30) Foreign Application Priority Data
Apr. 3, 2013 (JP) ................. 2013-077982

(51) Int. Cl.
| | |
|---|---|
| C08J 5/18 | (2006.01) |
| B32B 27/32 | (2006.01) |
| C08G 61/08 | (2006.01) |
| G02B 5/30 | (2006.01) |
| B32B 3/28 | (2006.01) |
| B32B 27/08 | (2006.01) |
| B32B 7/12 | (2006.01) |
| C08G 61/12 | (2006.01) |
| B32B 27/38 | (2006.01) |

(52) U.S. Cl.
CPC .............. *C08J 5/18* (2013.01); *B32B 27/322* (2013.01); *C08G 61/08* (2013.01); *G02B 5/3083* (2013.01); *B32B 3/28* (2013.01); *B32B 7/12* (2013.01); *B32B 27/08* (2013.01); *B32B 27/325* (2013.01); *B32B 27/38* (2013.01); *B32B 2255/10* (2013.01); *B32B 2255/26* (2013.01); *B32B 2270/00* (2013.01); *B32B 2307/412* (2013.01); *B32B 2307/414* (2013.01); *B32B 2307/416* (2013.01); *B32B 2307/516* (2013.01); *B32B 2307/518* (2013.01); *B32B 2457/202* (2013.01); *B32B 2551/00* (2013.01); *C08G 61/12* (2013.01); *C08G 2261/146* (2013.01); *C08G 2261/3324* (2013.01); *C08G 2261/3342* (2013.01); *C08G 2261/418* (2013.01); *C08J 2327/12* (2013.01)

(58) Field of Classification Search
None
See application file for complete search history.

(56) References Cited

U.S. PATENT DOCUMENTS

| | | | |
|---|---|---|---|
| 6,800,697 B2 | 10/2004 | Uchiyama et al. | |
| 6,875,819 B2 | 4/2005 | Sunaga et al. | |
| 7,274,419 B2 | 9/2007 | Tashiro et al. | |
| 7,630,039 B2 | 12/2009 | Tashiro et al. | |
| 7,719,646 B2 | 5/2010 | Tashiro et al. | |
| 8,211,514 B2 | 7/2012 | Kaminade et al. | |
| 2003/0086027 A1 | 5/2003 | Uchiyama et al. | |
| 2003/0187168 A1 | 10/2003 | Sunaga et al. | |

(Continued)

FOREIGN PATENT DOCUMENTS

| | | |
|---|---|---|
| JP | 2003-270435 A | 9/2003 |
| JP | 2003-292639 A | 10/2003 |

(Continued)

OTHER PUBLICATIONS

Machine translation of JP 2007-177046 A, retrieved Aug. 2017.*

(Continued)

*Primary Examiner* — Nicole M Buie-Hatcher
(74) *Attorney, Agent, or Firm* — Buchanan, Ingersoll & Rooney PC

(57) ABSTRACT

Disclosed is an optical film having low wavelength dispersibility which is obtained by stretching a film formed of a fluorine-containing cyclic olefin polymer including at least one selected from a repeating structural unit represented by the formula described below, wherein a phase difference at a wavelength of 550 nm is greater than or equal to 50 nm, wavelength dispersibility represented by a ratio Re (400 nm)/Re (550 nm) of a phase difference Re (400 nm) at a wavelength of 400 nm to a phase difference Re (550 nm) at a wavelength of 550 nm is 1.00 to 1.05, wavelength dispersibility represented by a ratio Re (400 nm)/Re (800 nm) of a phase difference Re (400 nm) at a wavelength of 400 nm to a phase difference Re (800 nm) at a wavelength of 800 nm is 1.00 to 1.05, and total light transmittance is greater than or equal to 92%.

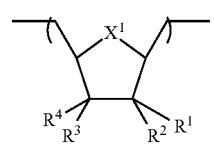

(1)

21 Claims, No Drawings

(56) References Cited

U.S. PATENT DOCUMENTS

| | | | |
|---|---|---|---|
| 2004/0242823 A1* | 12/2004 | Sekiguchi | C08G 61/06 526/279 |
| 2004/0257506 A1 | 12/2004 | Tashiro et al. | |
| 2006/0055856 A1 | 3/2006 | Tashiro et al. | |
| 2006/0061714 A1 | 3/2006 | Tashiro et al. | |
| 2011/0313121 A1 | 12/2011 | Kaminade et al. | |
| 2012/0156448 A1* | 6/2012 | Sunaga | C08F 283/14 428/195.1 |
| 2013/0030136 A1 | 1/2013 | Sunaga et al. | |

FOREIGN PATENT DOCUMENTS

| | | |
|---|---|---|
| JP | 2004-163680 A | 6/2004 |
| JP | 2004-177951 A | 6/2004 |
| JP | 2005-128047 A | 5/2005 |
| JP | 2007-108529 A | 4/2007 |
| JP | 2007-177046 A | 7/2007 |
| JP | 2008-268913 A | 11/2008 |
| JP | 2010-169952 A | 8/2010 |
| JP | 2011-112842 A | 6/2011 |
| JP | 2011-197409 A | 10/2011 |
| WO | WO 01/81959 A1 | 11/2001 |
| WO | WO 02/088216 A1 | 11/2002 |
| WO | WO 2011024421 A1 * | 3/2011 ............ C08F 283/14 |
| WO | WO 2011/125323 A1 | 10/2011 |

OTHER PUBLICATIONS

Machine translation of JP 2003-292639, retrieved Aug. 2017.*
Office Action issued by the Korean Patent Office in corresponding Korean Patent Application No. 10-2015-7027759 dated Jan. 24, 2017 (11 pages including partial English translation).
International Search Report (PCT/ISA/210) dated Jun. 24, 2014, by the Japanese Patent Office as the International Searching Authority for International Application No. PCT/JP2014/058339.

* cited by examiner

OPTICAL FILM

TECHNICAL FIELD

The present invention relates to an optical film having low wavelength dispersibility which is obtained by stretching a film formed of a fluorine-containing cyclic olefin polymer having a specific fluorine-containing aliphatic 5-membered ring structure. Further, the present invention relates to an optical film having reverse wavelength dispersibility which is obtained by laminating two or more films at an angle in which slow axes of the optical films are not coaxial.

BACKGROUND ART

Recently, an image display device such as a liquid crystal or an organic EL has been developed considerably, and the usage thereof has been expanded from a medium or small image display device such as a mobile phone or a personal computer monitor to a large image display device for a television. In such an image display device, in order to improve image display performance, various phase difference films are used for homogeneity of the display, improvement of contrast, enlargement of the viewing angle of the display, and the like. In order to obtain brilliant colors and a high-definition image, it is required that the phase difference film has uniform birefringence over the entire surface, and that optical properties are not changed even under environments of severe temperature and humidity conditions.

As a resin material to be used, a transparent film formed of polymer such as a polycarbonate (PC) or a cyclic olefin polymer is generally used. In general, in a case of a phase difference film which is formed by stretching and orienting a film formed of a polycarbonate, a photoelastic constant increases to approximately $100 \times 10^{-12}$/Pa, and thus birefringence excessively increases and becomes uneven, and the birefringence is changed by slight stress which is generated at the time of assembling such as laminating or an environmental change. In addition, except for some brands of the phase difference film, wavelength dependency of a phase difference increases in a positive sign (a phase difference at a short wavelength increases with respect to the center wavelength and a phase difference at a long wavelength decreases with respect to the center wavelength), and thus light leakage occurs, and the homogeneity and the contrast of the display are degraded.

In order to solve the problems generated from the original physical properties of the resin, a phase difference film which is formed by stretching and orienting a film formed of a cyclic olefin polymer which is a material having a comparatively small photoelastic constant is used (for example, Patent Document 1 and Patent Document 2). Among them, it is disclosed that a phase difference film which is prepared by stretching and orienting a film formed of a cyclic olefin polymer having a photoelastic constant in a range of 0 to $20 \times 10^{-12}$/Pa has excellent initial properties, is rarely affected by a usage environment or manufacturing conditions, and has excellent reliability (Patent Document 1).

In addition, the wavelength dependency of the phase difference is comparatively small, and thus the phase difference film formed of the cyclic olefin polymer is preferably used as a display material member. However, even when the phase difference film formed of the cyclic olefin polymer of the related art is a material having an excellent optical function such as transparency and a phase difference, adhesiveness at the time of laminating the film or at the time of mounting the film on the image display device is not sufficient. Further in the present in which high-definition, energy saving, or the like of the image display are further required, there are demands that the performance of a phase difference function such as wavelength dependency is further improved, and that the transparency of the film contributing to the energy saving is increased.

The properties of the wavelength dependency of the phase difference are able to be divided into three categories of properties having the positive sign described above, properties not having wavelength dependency, and properties having a negative sign (the phase difference at the short wavelength decreases with respect to the center wavelength, and the phase difference at the long wavelength increases with respect to the center wavelength), and thus the phase difference film is suitably arranged and used in various image devices by using the respective properties.

Here, in particular, a wavelength dispersion of a negative sign is generally referred to as reverse wavelength dispersion. The materials of the related art are mostly materials having a positive sign, and in particular, in an initial liquid crystal display material using a material which has a comparatively large positive sign, the material caused a decrease in the performance of the display. Studies have been made thereafter to form a polymer material of the film into a composition, or to make the material multi-layered, and thus it has become possible to comparatively decrease positive wavelength dependency. However, sufficient performance has not been obtained in some usage.

In addition, as a polymer material not having wavelength dependency, polyvinyl alcohol (PVA) is known. However, the polyvinyl alcohol does not have sufficient dimensional stability in a usage environment and requires a protective film such as seen in a polarization plate, and thus the film formed of the material is not able to be practically used as a phase difference film. Further, as the material having the negative sign, a phase difference film obtained by stretching a film formed of a special polycarbonate is used in some applications (Patent Document 3). However, problems may occur during usage due to a photoelastic constant specific to the polycarbonate resin described above. In addition, as the material having the negative sign, a system using a composition of the polymer material (Patent Document 4), a system laminating the phase difference film (Patent Document 5), a system using a special cyclic olefin polymer in a film material (Patent Document 6 and Patent Document 7), and the like are disclosed, but no system is widely used from a viewpoint of the complexity of each step such as a synthesizing step of the polymer material, a film preparing step, and a stretching step, or the price of the product, and the like.

Further, as a fluorine-containing cyclic olefin copolymer, a copolymer having a 5-membered ring structure (A) and a plurality of cyclic structures (B) in a main chain is included, and it is known that an optical material having a molar ratio (A)/(B) of 95/5 to 1/99 has low birefringence even when a polymer chain itself is oriented (Patent Document 8). Even when this copolymer is stretched, it is not possible to manufacture the phase difference film.

RELATED DOCUMENT

Patent Document

[Patent Document 1] Japanese Patent Publication No. JP-A-2005-128047

[Patent Document 2] Japanese Patent Publication No. JP-A-2003-270435

[Patent Document 3] Pamphlet of International Publication No. JP-A-WO2001/081959
[Patent Document 4] Japanese Patent Publication No. JP-A-2011-112842
[Patent Document 5] Japanese Patent Publication No. JP-A-2004-177951
[Patent Document 6] Japanese Patent Publication No. JP-A-2010-169952
[Patent Document 7] Japanese Patent Publication No. JP-A-2007-108529
[Patent Document 8] Pamphlet of International Publication No. WO2011/125323

SUMMARY OF THE INVENTION

The present invention is made in consideration of such a situation as described above, and an object thereof is to provide an optical film which has excellent transparency, toughness, and moldability of a fluorine-containing cyclic olefin polymer, and extremely low wavelength dispersibility of a phase difference. Further, another object of the present invention is to provide an optical film which has transparency and toughness and has wavelength dispersibility of a phase difference having reverse wavelength dispersibility by laminating two or more of the optical films described above at an angle in which slow axes are not coaxial.

The present invention is as follows.

[1] An optical film having low wavelength dispersibility which is obtained by stretching a film formed of a fluorine-containing cyclic olefin polymer including at least one selected from a repeating structural unit substantially represented by General Formula (1) described below,
in which a phase difference at a wavelength of 550 nm is greater than or equal to 50 nm, wavelength dispersibility represented by a ratio Re (400 nm)/Re (550 nm) of a phase difference Re (400 nm) at a wavelength of 400 nm to a phase difference Re (550 nm) at a wavelength of 550 nm is 1.00 to 1.05, wavelength dispersibility represented by a ratio Re (400 nm)/Re (800 nm) of a phase difference Re (400 nm) at a wavelength of 400 nm to a phase difference Re (800 nm) at a wavelength of 800 nm is 1.00 to 1.05, and total light transmittance is greater than or equal to 92%:

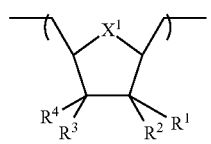

(In Formula (1), at least one of $R^1$ to $R^4$ is selected from fluorine, fluorine-containing alkyl having 1 to 10 carbon atoms, fluorine-containing alkoxy having 1 to 10 carbon atoms, fluorine-containing alkoxy alkyl having 2 to 10 carbon atoms, fluorine-containing aryl having 6 to 20 carbon atoms, fluorine-containing alkoxy carbonyl having 2 to 10 carbon atoms, fluorine-containing aryloxy carbonyl having 7 to 20 carbon atoms, fluorine-containing alkoxy carbonyl alkyl having 3 to 10 carbon atoms, and fluorine-containing aryloxy carbonyl alkyl having 8 to 20 carbon atoms, and $R^1$ to $R^4$ may be identical to each other or different from each other. When $R^1$ to $R^4$ are groups other than fluorine or the substituent groups described above, $R^1$ to $R^4$ are each independently selected from hydrogen, alkyl having 1 to 10 carbon atoms, aryl having 6 to 20 carbon atoms, alkoxy having 1 to 10 carbon atoms, alkoxy alkyl having 2 to 10 carbon atoms, alkoxy carbonyl having 2 to 10 carbon atoms, aryloxy carbonyl having 7 to 20 carbon atoms, alkoxy carbonyl alkyl having 3 to 10 carbon atoms, or aryloxy carbonyl alkyl having 8 to 20 carbon atoms. $X^1$ is selected from —O—, —S—, —$NR^5$—, —$PR^5$—, and —$CR^5R^6$— ($R^5$ and $R^6$ each independently representing hydrogen or alkyl having 1 to 20 carbon atoms).

[2] The optical film according to [1], in which the optical film is a λ/4 wavelength plate or a λ/2 wavelength plate.

[3] The optical film according to [2], in which the optical film, obtained by subjecting a varnish of the fluorine-containing cyclic olefin polymer to fine filtration by being passed through a filter including a hole having a hole diameter of less than or equal to 0.5 μm, and subsequently forming a film, is a λ/4 wavelength plate or a λ/2 wavelength plate.

[4] The optical film according to [3], in which in the λ/4 wavelength plate, a phase difference at a wavelength of 550 nm is 140±10 nm.

[5] The optical film according to [3], in which in the λ/2 wavelength plate, a phase difference at a wavelength of 550 nm is 280±20 nm.

[6] The optical film according to [3], in which in the λ/4 wavelength plate and the λ/2 wavelength plate, phase difference unevenness at a wavelength of 550 nm is less than or equal to ±0.50 nm/cm².

[7] The optical film according to [3], in which in the λ/4 wavelength plate and the λ/2 wavelength plate, reflectance at a wavelength of 550 nm is less than or equal to 7.0%.

[8] An optical film obtained by laminating two or more of the optical films according to [1] to each other at an angle in which slow axes are not coaxial, in which reverse wavelength dispersibility Re (400 nm)/Re (550 nm) is less than 1.00, and total light transmittance is greater than or equal to 91%.

[9] The optical film according to [8], in which two or more of the optical films are laminated through an adhesive material of which a refractive index difference (Δn) with respect to the optical film is less than or equal to 0.1.

[10] The optical film according to [8] or [9], in which the optical film is a λ/4 wavelength plate or a λ/2 wavelength plate.

[11] The optical film according to [10], in which the optical film, obtained by subjecting a varnish of the fluorine-containing cyclic olefin polymer to fine filtration by being passed through a filter including a hole having a hole diameter of less than or equal to 0.5 μm, and subsequently forming a film, is a λ/4 wavelength plate or a λ/2 wavelength plate.

[12] The optical film according to [11], in which in the λ/4 wavelength plate, a phase difference at a wavelength of 550 nm is 140±10 nm.

[13] The optical film according to [11], in which in the λ/2 wavelength plate, a phase difference at a wavelength of 550 nm is 280±20 nm.

[14] The optical film according to [11], in which in the λ/4 wavelength plate and the λ/2 wavelength plate, phase difference unevenness at a wavelength of 550 nm is less than or equal to ±0.50 nm/cm².

[15] The optical film according to [11], in which in the λ/4 wavelength plate and the λ/2 wavelength plate, reflectance at a wavelength of 550 nm is less than or equal to 7.0%.

In the present invention, "a fluorine-containing cyclic olefin polymer including at least one selected from a repeating structural unit substantially represented by General Formula (1) described below" excludes a structural unit having a plurality of cyclic structures, and may include a configuration unit other than the configuration unit represented by General Formula (1) within a range of not impairing the effects of the present invention.

The present invention is able to provide an optical film having low wavelength dispersibility which is obtained by stretching a film formed of a specific fluorine-containing 5-membered cyclic olefin polymer, which has an extremely low change of a phase difference in a range of a light wavelength of 400 nm to 800 nm, and extremely high transparency. Further, the present invention is able to provide an optical film having reverse wavelength dispersion properties with extremely high transparency by laminating the stretched films to each other at an angle in which slow axes of the optical films of the present invention are not coaxial, and thus the present invention has industrial applicability.

DESCRIPTION OF EMBODIMENTS

Hereinafter, an optical film of the present invention will be described with reference to an embodiment.

An optical film of this embodiment is an optical film having low wavelength dispersibility which is obtained by stretching a film formed of a fluorine-containing cyclic olefin polymer including at least one selected from a repeating structural unit substantially represented by General Formula (1) described below, having the following properties.

A phase difference at a wavelength of 550 nm is greater than or equal to 50 nm, wavelength dispersibility represented by a ratio Re (400 nm)/Re (550 nm) of a phase difference Re (400 nm) at a wavelength of 400 nm to a phase difference Re (550 nm) at a wavelength of 550 nm is 1.00 to 1.05, wavelength dispersibility represented by a ratio Re (400 nm)/Re (800 nm) of a phase difference Re (400 nm) at a wavelength of 400 nm to a phase difference Re (800 nm) at a wavelength of 800 nm is 1.00 to 1.05, and total light transmittance is greater than or equal to 92%.

Hereinafter, the fluorine-containing cyclic olefin polymer configuring the optical film will be described.

[Fluorine-Containing Cyclic Olefin Polymer]

In this embodiment, the fluorine-containing cyclic olefin polymer is formed of at least one of the repeating structural unit substantially represented by General Formula (1) described below.

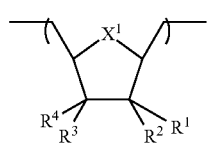

(1)

In Formula (1), at least one of $R^1$ to $R^4$ is selected from fluorine, fluorine-containing alkyl having 1 to 10 carbon atoms, fluorine-containing alkoxy having 1 to 10 carbon atoms, fluorine-containing alkoxy alkyl having 2 to 10 carbon atoms, fluorine-containing aryl having 6 to 20 carbon atoms, fluorine-containing alkoxy carbonyl having 2 to 10 carbon atoms, fluorine-containing aryloxy carbonyl having 7 to 20 carbon atoms, fluorine-containing alkoxy carbonyl alkyl having 3 to 10 carbon atoms, and fluorine-containing aryloxy carbonyl alkyl having 8 to 20 carbon atoms, and $R^1$ to $R^4$ may be identical to each other or different from each other.

When $R^1$ to $R^4$ include fluorine, as $R^1$ to $R^4$, specifically, fluorine, or, fluorine-containing alkyl having 1 to 10 carbon atoms such as alkyl in which a part or all of the hydrogen is substituted with fluorine, such as fluoromethyl, difluoromethyl, trifluoromethyl, trifluoroethyl, pentafluoroethyl, heptafluoropropyl, hexafluoroisopropyl, heptafluoroisopropyl, hexafluoro-2-methyl isopropyl, perfluoro-2-methyl isopropyl, n-perfluorobutyl, n-perfluoropentyl, and perfluorocyclopentyl, fluorine-containing alkoxy having 1 to 10 carbon atoms such as alkoxy in which a part or all of the hydrogen is substituted with fluorine, such as fluoromethoxy, difluoromethoxy, trifluoromethoxy, trifluoroethoxy, pentafluoroethoxy, heptafluoropropoxy, hexafluoroisopropoxy, heptafluoroisopropoxy, hexafluoro-2-methyl isopropoxy, perfluoro-2-methyl isopropoxy, n-perfluorobutoxy, n-perfluoropentyl oxy, and perfluorocyclopentyl oxy, fluorine-containing alkoxy alkyl having 2 to 10 carbon atoms such as alkoxy alkyl in which a part or all of the hydrogen is substituted with fluorine, such as fluoromethoxy methyl, difluoromethoxy methyl, trifluoromethoxy methyl, trifluoroethoxy methyl, pentafluoroethoxy methyl, heptafluoropropoxy methyl, hexafluoroisopropoxy methyl, heptafluoroisopropoxy methyl, hexafluoro-2-methyl isopropoxy methyl, perfluoro-2-methyl isopropoxy methyl, n-perfluorobutoxy methyl, n-perfluoropentyl oxy methyl, and perfluorocyclopentyl oxy methyl, fluorine-containing aryl having 6 to 20 carbon atoms such as aryl in which a part or all of the hydrogen is substituted with fluorine, such as perfluorophenyl, and trifluorophenyl, fluorine-containing alkoxy carbonyl having 2 to 10 carbon atoms such as alkoxy carbonyl in which a part or all of the hydrogen is substituted with fluorine, such as fluoromethoxy carbonyl, difluoromethoxy carbonyl, trifluoromethoxy carbonyl, trifluoroethoxy carbonyl, pentafluoroethoxy carbonyl, heptafluoropropoxy carbonyl, hexafluoroisopropoxy carbonyl, heptafluoroisopropoxy carbonyl, hexafluoro-2-methyl isopropoxy carbonyl, perfluoro-2-methyl isopropoxy carbonyl, n-perfluorobutoxy carbonyl, n-perfluoropentyl oxy carbonyl, and perfluorocyclopentyl oxy carbonyl, fluorine-containing aryloxy carbonyl having 7 to 20 carbon atoms such as aryloxy carbonyl in which a part or all of the hydrogen is substituted with fluorine, such as perfluorophenyl oxy carbonyl, and trifluorophenyl oxy carbonyl, fluorine-containing alkoxy carbonyl alkyl having 3 to 10 carbon atoms such as alkoxy carbonyl alkyl in which a part or all of the hydrogen is substituted with fluorine, such as fluoromethoxy carbonyl methyl, difluoromethoxy carbonyl methyl, trifluoromethoxy carbonyl methyl, trifluoroethoxy carbonyl methyl, pentafluoroethoxy carbonyl methyl, heptafluoropropoxy carbonyl methyl, hexafluoroisopropoxy carbonyl methyl, heptafluoroisopropoxy carbonyl methyl, hexafluoro-2-methyl isopropoxy carbonyl methyl, perfluoro-2-methyl isopropoxy carbonyl methyl, n-perfluorobutoxy carbonyl methyl, n-perfluoropentyl oxy carbonyl methyl, and perfluorocyclopentyl oxy methyl, fluorine-containing aryloxy carbonyl alkyl having 8 to 20 carbon atoms such as aryloxy carbonyl methyl in which a part or all of the hydrogen is substituted with fluorine, such as perfluorophenyl oxy carbonyl methyl, and trifluorophenyl oxy carbonyl methyl, and the like are able to be exemplified.

When $R^1$ to $R^4$ are groups other than fluorine or the substituent groups described above, as each of $R^1$ to $R^4$, hydrogen, alkyl having 1 to 10 carbon atoms, aryl having 6 to 20 carbon atoms, alkoxy having 1 to 10 carbon atoms, alkoxy alkyl having 2 to 10 carbon atoms, alkoxy carbonyl having 2 to 10 carbon atoms, aryloxy carbonyl having 7 to 20 carbon atoms, alkoxy carbonyl alkyl having 3 to 10 carbon atoms, aryloxy carbonyl alkyl having 8 to 20 carbon atoms, and the like are able to be exemplified.

When $R^1$ to $R^4$ are groups other than fluorine or the substituent groups described above, as $R^1$ to $R^4$, specifically, hydrogen, or alkyl having 1 to 10 carbon atoms such as methyl, ethyl, propyl, isopropyl, 2-methyl isopropyl, n-butyl, n-pentyl, and cyclopentyl, aryl having 6 to 20 carbon atoms such as phenyl, and naphthyl, alkoxy having 1 to 10 carbon atoms such as methoxy, ethoxy, and tert-butoxy, alkoxy alkyl having 2 to 10 carbon atoms such as methoxy methyl, ethoxy methyl, and tert-butoxy methyl, alkoxy carbonyl having 2 to 10 carbon atoms such as methoxy carbonyl, ethoxy carbonyl, and tert-butoxy carbonyl, aryloxy carbonyl having 7 to 20 carbon atoms such as phenyl oxy carbonyl, and methyl phenyl oxy carbonyl, alkoxy carbonyl alkyl having 3 to 10 carbon atoms such as methoxy carbonyl methyl, ethoxy carbonyl methyl, and tert-butoxy carbonyl methyl, aryloxy carbonyl alkyl having 8 to 20 carbon atoms such as phenyl oxy carbonyl methyl, and methyl phenyl oxy carbonyl methyl, and the like are able to be exemplified.

In addition, $R^1$ to $R^4$ may form a cyclic structure by being bonded to each other, and for example, may form a ring such as perfluorocycloether through perfluorocycloalkyl, and oxygen.

However, General Formula (1) does not include an aspect in which $R^1$ to $R^4$ form a cyclic structure by being bonded to each other, and thus becomes a structural unit having a plurality of cyclic structures. It is known that an optical film obtained by stretching a film formed of a fluorine-containing cyclic olefin polymer including a structural unit having a plurality of cyclic structures has low birefringence even when oriented, and thus this optical film is not preferable from a viewpoint of a phase difference film. The structural unit having the plurality of cyclic structures is not particularly limited, and as the structural unit having the plurality of cyclic structures, for example, a structural unit represented by General Formula (2) described below is able to be included.

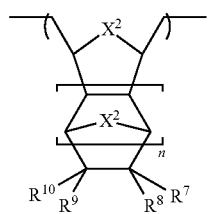

(2)

In Formula (2), at least one of $R^7$ to $R^{10}$ is selected from fluorine, fluorine-containing alkyl having 1 to 10 carbon atoms, fluorine-containing alkoxy having 1 to 10 carbon atoms, fluorine-containing alkoxy alkyl having 2 to 10 carbon atoms, fluorine-containing aryl having 6 to 20 carbon atoms, fluorine-containing alkoxy carbonyl having 2 to 10 carbon atoms, fluorine-containing aryloxy carbonyl having 7 to 20 carbon atoms, fluorine-containing alkoxy carbonyl alkyl having 3 to 10 carbon atoms, and fluorine-containing aryloxy carbonyl alkyl having 8 to 20 carbon atoms. $X^2$ is selected from —O—, —S—, —$NR^{11}$—, —$PR^{11}$—, and —$CR^{11}R^{12}$— ($R^{11}$ and $R^{12}$ each independently representing hydrogen or alkyl having 1 to 20 carbon atoms), and $X^2$ may be identical to each other or different from each other. n represents 1 to 3.

In this embodiment, $X^1$ of General Formula (1) is selected from —O—, —S—, —$NR^5$—, —$PR^5$—, and —$CR^5R^6$— ($R^5$ and $R^6$ each independently representing hydrogen or alkyl having 1 to 20 carbon atoms).

In this embodiment, the fluorine-containing cyclic olefin polymer may be configured of one selected from the repeating structural unit represented by General Formula (1), or may be configured of two or more structural units in which at least one of $R^1$ to $R^4$ of General Formula (1) is different from the others.

As the fluorine-containing cyclic olefin polymer, for example, poly(1-fluoro-2-trifluoromethyl-3,5-cyclopentylene ethylene), poly(1-fluoro-1-trifluoromethyl-3,5-cyclopentylene ethylene), poly(1-methyl-1-fluoro-2-trifluoromethyl-3,5-cyclopentylene ethylene), poly(1,1-difluoro-2-trifluoromethyl-3,5-cyclopentylene ethylene), poly(1,2-difluoro-2-trifluoromethyl-3,5-cyclopentylene ethylene), poly(1-perfluoroethyl-3,5-cyclopentylene ethylene), poly(1,1-bis(trifluoromethyl)-3,5-cyclopentylene ethylene), poly(1,1,2-trifluoro-2-trifluoromethyl-3,5-cyclopentylene ethylene), poly[1,2-bis(trifluoromethyl)-3,5-cyclopentylene ethylene], poly(1-perfluoropropyl-3,5-cyclopentylene ethylene), poly(1-methyl-2-perfluoropropyl-3,5-cyclopentylene ethylene), poly(1-butyl-2-perfluoropropyl-3,5-cyclopentylene ethylene), poly(1-perfluoroisopropyl-3,5-cyclopentylene ethylene), poly(1-methyl-2-perfluoroisopropyl-3,5-cyclopentylene ethylene), poly(1,2-difluoro-1,2-bis(trifluoromethyl)-3,5-cyclopentylene ethylene), poly(1,1,2,2,3,3,3a,6a-octafluorocyclopentyl-4,6-cyclopentylene ethylene), poly(1,1,2,2,3,3,4,4,3a,7a-decafluorocyclohexyl-5,7-cyclopentylene ethylene), poly(1-perfluorobutyl-3,5-cyclopentylene ethylene), poly(1-perfluoro-iso-butyl-3,5-cyclopentylene ethylene), poly(1-perfluoro-tert-butyl-3,5-cyclopentylene ethylene), poly(1-methyl-2-perfluoro-iso-butyl-3,5-cyclopentylene ethylene), poly(1-butyl-2-perfluoro-iso-butyl-3,5-cyclopentylene ethylene), poly(1,2-difluoro-1-trifluoromethyl-2-perfluoroethyl-3,5-cyclopentylene ethylene), poly[1-(1-trifluoromethyl-2,2,3,3,4,4,5,5-octafluoro-cyclopentyl)-3,5-cyclopentylene ethylene)], poly[(1,1,2-trifluoro-2-perfluorobutyl)-3,5-cyclopentylene ethylene], poly(1,2-difluoro-1-trifluoromethyl-2-perfluorobutyl-3,5-cyclopentylene ethylene), poly[1-fluoro-1-perfluoroethyl-2,2-bis(trifluoromethyl)-3,5-cyclopentylene ethylene], poly[1,2-difluoro-1-perfluoropropyl-2-trifluoromethyl)-3,5-cyclo pentylene ethylene], poly(1-perfluorohexyl-3,5-cyclopentylene ethylene), poly(1-methyl-2-perfluorohexyl-3,5-cyclopentylene ethylene), poly(1-butyl-2-perfluorohexyl-3,5-cyclopentylene ethylene), poly(1-hexyl-2-perfluorohexyl-3,5-cyclopentylene ethylene), poly(1-octyl-2-perfluorohexyl-3,5-cyclopentylene ethylene), poly(1-perfluoroheptyl-3,5-cyclopentylene ethylene), poly(1-perfluorooctyl-3,5-cyclopentylene ethylene), poly(1-perfluorodecanyl-3,5-cyclopentylene ethylene), poly(1,1,2-trifluoro-perfluoropentyl-3,5-cyclopentylene ethylene), poly(1,2-difluoro-1-trifluoromethyl-2-perfluorobutyl-3,5-cyclopentylene ethylene), poly(1,1,2-trifluoro-2-perfluorohexyl-3,5-cyclopentylene ethylene), poly(1,2-difluoro-1-trifluoromethyl-2-perfluoropentyl-3,5-cyclopentylene ethylene), poly[1,2-bis(perfluorobutyl)-3,5-cyclopentylene ethylene], poly[1,2-bis(perfluorohexyl)-3,5-cyclopentylene ethylene], poly(1-methoxy-2-trifluoromethyl-3,5-cyclopentylene ethylene), poly(1-tert-butoxy methyl-2-trifluoromethyl-3,5-cyclopentylene ethylene), poly(1-phenyl oxy carbonyl-2-trifluoromethyl-3,5-cyclopentylene ethylene), poly(1-phenyl oxy carbonyl methyl-2-trifluoromethyl-3,5-cyclopentylene ethylene), poly(1,1,3,3,3a,6a-hexafluorofuranyl-3,5-cyclopentylene ethylene), and the like are included, poly(1-fluoro-2-trifluoromethoxy-3,5-cyclopentylene ethylene), poly(1-fluoro-1-trifluoromethoxy-3,5-cyclopentylene ethylene), poly(1-methyl-1-fluoro-2-trifluoromethoxy-3,5-cyclopentylene ethylene), poly(1,1-difluoro-2-trifluoromethoxy-3,5-cyclopentylene ethylene), poly(1,2-difluoro-2-trifluoromethoxy-3,5-cyclopentylene ethylene), poly(1-perfluoroethoxy-3,5-cyclopentylene ethylene), poly(1,1-bis(trifluoromethoxy)-3,5-cyclopentylene ethylene), poly(1,1,2-trifluoro-2-trifluoromethoxy-3,5-cyclopentylene ethylene), poly(1,2-bis(trifluoromethoxy)-3,5-cyclopentylene ethylene), poly(1-perfluoropropoxy-3,5-cyclopentylene ethylene), poly(1-methyl-2-perfluoropropoxy-3,5-cyclopentylene ethylene), poly(1-butyl-2-perfluoropropoxy-3,5-cyclopentylene ethylene), poly(1-perfluoro-iso-propoxy-3,5-cyclopentylene ethylene), poly(1-methyl-2-perfluoro-iso-propoxy-3,5-cyclopentylene ethylene), poly(1,2-difluoro-1,2-bis(trifluoromethoxy)-3,5-cyclopentylene ethylene), poly(1-perfluorobutoxy-3,5-cyclopentylene ethylene), poly(1-perfluoro-iso-butoxy-3,5-cyclopentylene ethylene), poly(1-perfluoro-tert-butoxy-3,5-cyclopentylene ethylene), poly(1-methyl-2-perfluoro-iso-butoxy-3,5-cyclopentylene ethylene), poly(1-butyl-2-perfluoro-iso-butoxy-3,5-cyclopentylene ethylene), poly(1,2-difluoro-1-trifluoromethoxy-2-perfluoroethoxy-3,5-cyclo pentylene ethylene), poly(1,1,2-trifluoro-2-perfluorobutoxy-3,5-cyclopentylene ethylene), poly(1,2-difluoro-1-trifluoromethoxy-2-perfluorobutoxy-3,5-cyclo pentylene ethylene), poly(1-fluoro-1-perfluoroethoxy-2,2-bis(trifluoromethoxy)-3,5-cyclopentylene ethylene), poly(1,2-difluoro-1-perfluoropropoxy-2-trifluoromethoxy)-3,5-cyclopentylene ethylene), poly(1,1,2-trifluoro-2-perfluoropentyl oxy-3,5-cyclopentylene ethylene), poly(1,2-difluoro-1-trifluoromethoxy-2-perfluorobutoxy-3,5-cyclo pentylene ethylene), poly(1,2-difluoro-1-trifluoromethoxy-2-perfluoropentyl-3,5-cyclo pentylene ethylene), poly(1,2-bis(perfluorobutoxy)-3,5-cyclopentylene ethylene), poly(1-methoxy-2-trifluoromethoxy-3,5-cyclopentylene ethylene), poly(1-tert-butoxy methyl-2-trifluoromethoxy-3,5-cyclopentylene ethylene), poly(1-phenyl oxy carbonyl-2-trifluoromethoxy-3,5-cyclopentylene ethylene), poly(1-phenyl oxy carbonyl methyl-2-trifluoromethoxy-3,5-cyclopentylene ethylene), poly(1-(2',2',2'-trifluoroethoxy)-3,5-cyclopentylene ethylene), poly(1-(2',2',3',3',3'-pentafluoropropoxy)-3,5-cyclopentylene ethylene), poly(1-methyl-2-(2',2',3',3',3'-pentafluoropropoxy)-3,5-cyclopentylene ethylene), poly(1-butyl-2-(2',2',3',3',3'-pentafluoropropoxy)-3,5-cyclopentylene ethylene), poly(1-(1',1',1'-trifluoro-iso-propoxy)-3,5-cyclopentylene ethylene), poly(1-methyl-(1',1',1'-trifluoro-iso-propoxy)-3,5-cyclopentylene ethylene), poly(1-(2',2',3',3',4',4',4'-heptafluorobutoxy)-3,5-cyclopentylene ethylene), poly(1-(1',1',1'-trifluoro-iso-butoxy)-3,5-cyclopentylene ethylene), poly(1-methyl-2-(1',1',1'-trifluoro-iso-butoxy)-3,5-cyclopentylene ethylene), poly(1-butyl-2-(1',1',1'-trifluoro-iso-butoxy)-3,5-cyclopentylene ethylene), poly(1,2-difluoro-1-trifluoromethoxy-2-(2',2',2'-trifluoroethoxy)-3,5-cyclopentylene ethylene), poly(1,1,2-trifluoro-2-(2',2',3',3',4',4',4'-heptafluorobutoxy)-3,5-cyclopentylene ethylene), poly(1,2-difluoro-1-trifluoromethoxy-2-(2',2',3',3',4',4',4'-heptafluorobutoxy)-3,5-cyclopentylene ethylene), poly(1-fluoro-1-(2',2',2',-trifluoroethoxy)-2,2-bis(trifluoromethoxy)-3,5-cyclopentylene ethylene), poly(1,2-difluoro-1-(2',2',3',3',3'-pentafluoropropoxy)-2-trifluoromethoxy-3,5-cyclopentylene ethylene), poly(1,2-difluoro-1-trifluoromethoxy-2-perfluoropentyl-3,5-cyclo pentylene ethylene), poly(1,2-bis(perfluorobutoxy)-3,5-cyclopentylene ethylene), poly(1,1,2-trifluoro-2-(1',1',1'-trifluoro-iso-propoxy)-3,5-cyclopentylene ethylene), poly(1,2-difluoro-1-trifluoromethoxy-2-(2',2',3',3',4',4',4'-heptafluorobutoxy)-3,5-cyclopentylene ethylene), poly(1,2-bis(2',2',3',3',4',4',4'-heptafluorobutoxy)-3,5-cyclopentylene ethylene), poly(1,2-bis(perfluorohexyl oxy)-3,5-cyclopentylene ethylene), and the like are included, and, poly(1-trifluoromethoxy carbonyl-3,5-cyclopentylene ethylene), poly(1-methyl-2-trifluoromethoxy carbonyl-3,5-cyclopentylene ethylene), poly(1-methoxy-2-trifluoromethoxy carbonyl-3,5-cyclopentylene ethylene), poly(1-tert-butoxy methyl-2-trifluoromethoxy carbonyl-3,5-cyclopentylene ethylene), poly(1-phenyl oxy carbonyl-2-trifluoromethoxy carbonyl-3,5-cyclopentylene ethylene), poly(1-phenyl oxy carbonyl methyl-2-trifluoromethoxy carbonyl-3,5-cyclopentylene ethylene), poly(1-(hexafluoro-2'-methyl isopropoxy carbonyl)-3,5-cyclopentylene ethylene), poly(1-(perfluoro-2'-methyl isopropoxy carbonyl)-3,5-cyclopentylene ethylene), poly(1-perfluorophenyl oxy carbonyl-3,5-cyclopentylene ethylene), poly(1-methyl-1-perfluorophenyl oxy carbonyl-3,5-cyclopentylene ethylene), poly(1-methoxy-2-perfluorophenyl oxy carbonyl-3,5-cyclopentylene ethylene), poly(1-tert-butoxy methyl-2-perfluorophenyl oxy carbonyl-3,5-cyclopentylene ethylene), poly(1-phenyl oxy carbonyl-2-perfluorophenyl oxy carbonyl-3,5-cyclopentylene ethylene), poly(1-phenyl oxy carbonyl methyl-2-perfluorophenyl oxy carbonyl-3,5-cyclopentylene ethylene), poly(1-trifluoromethoxy carbonyl methyl-3,5-cyclopentylene ethylene), poly(1-methyl-2-trifluoromethoxy carbonyl methyl-3,5-cyclopentylene ethylene), poly(1-methoxy-2-trifluoromethoxy carbonyl methyl-3,5-cyclopentylene ethylene), poly(1-tert-butoxy methyl-2-trifluoromethoxy carbonyl methyl-3,5-cyclopentylene ethylene), poly(1-phenyl oxy carbonyl-2-trifluoromethoxy carbonyl methyl-3,5-cyclopentylene ethylene), poly(1-phenyl oxy carbonyl methyl-2-trifluoromethoxy carbonyl methyl-3,5-cyclopentylene ethylene), poly(1-(hexafluoro-2'-methyl isopropoxy carbonyl methyl)-3,5-cyclopentylene ethylene), poly(1-(perfluoro-2'-methyl isopropoxy carbonyl methyl)-3,5-cyclopentylene ethylene), poly(1-perfluorophenyl oxy carbonyl methyl-3,5-cyclopentylene ethylene), poly(1-methyl-1-perfluorophenyl oxy carbonyl methyl-3,5-cyclopentylene ethylene), poly(1-methoxy-2-perfluorophenyl oxy carbonyl methyl-3,5-cyclopentylene ethylene), poly(1-tert-butoxy methyl-2-perfluorophenyl oxy carbonyl methyl-3,5-cyclopentylene ethylene), poly(1-phenyl oxy carbonyl-2-perfluorophenyl oxy carbonyl methyl-3,5-cyclopentylene ethylene), poly(1-phenyl oxy carbonyl methyl-2-perfluorophenyl oxy carbonyl methyl-3,5-cyclopentylene ethylene), and the like are included.

Further, as the cyclic olefin polymer, a cyclic olefin polymer in which, in cyclopentylene included in the cyclic olefin polymer exemplified above (corresponding to the repeating structural unit of General Formula (1)), —CH$_2$— (corresponding to $X^1$ of General Formula (1)) is substituted with at least one selected from —O—, —S—, —NR$^5$—, —PR$^5$—, and —CR$^5$R$^6$— (R$^5$ and R$^6$ each independently representing hydrogen or alkyl having 1 to 20 carbon atoms) is able to be included.

The molecular weight of the fluorine-containing cyclic olefin polymer is generally 5,000 to 1,000,000, and is preferably 10,000 to 300,000 in weight average molecular weight (Mw) in terms of polystyrene which is measured at a sample concentration of 3.0 mg/ml to 9.0 mg/ml by using a gel permeation chromatography (GPC). When the weight average molecular weight (Mw) is greater than or equal to 5,000, orientation properties by stretching are able to be expressed. In addition, when the weight average molecular weight (Mw) is less than or equal to 1,000,000, fluidity enabling melt molding and melt stretching to be performed is able to be obtained. That is, according to the range described above, an excellent balance in these properties is obtained. In addition, a molecular weight distribution (Mw/Mn) which is a ratio between weight average molecular weight (Mw) and number average molecular weight (Mn) is generally in a range of 1.3 to 5.0, is preferably in a range of 1.5 to 4.5, and is more preferably in a range of 1.7 to 4.0. When the molecular weight distribution (Mw/Mn) is less than 1.3, it is difficult to perform stretching and orienting, and a function as the phase difference film may not be expressed. In addition, when the molecular weight distribution (Mw/Mn) is greater than 5.0, the film is suspended between stretching chucks at the time of heating the film, and the optical film having a desired phase difference may not be obtained. Therefore, when the molecular weight distribution (Mw/Mn) is in this range, the phase difference film is able to be suitably obtained.

The glass transition temperature of the fluorine-containing cyclic olefin polymer, measured by using differential scanning calorimetric analysis, is generally in a range of 50° C. to 300° C., is preferably in a range of 80° C. to 280° C., and is more preferably in a range of 100° C. to 250° C. When the glass transition temperature is in the range described above, it is possible to maintain the shape according to the environment for usage, obtain excellent fluidity and manufacturing stability, and excellent color phase of the obtained optical film.

A partially fluorinated polymer of General Formula (1) of the present invention, different from a completely fluorinated polymer in which a main chain also has a fluorine carbide structure, can express strong adhesiveness with respect to an adhesive material laminating the films even compared to a hydrocarbon-based cyclic olefin resin and an ester-based cyclic olefin resin, and thus a laminated optical film having excellent adhesiveness is obtained. This is assumed to be because, for example, the fluorine-containing cyclic olefin polymer of General Formula (1), which is a partial fluorinated polymer in which a main chain is hydrocarbon and a fluorine atom is included on a side chain, is an amorphous and transparent polymer and has high polarity, that is, the fluorine-containing cyclic olefin polymer has a structure in which a dipole moment is comparatively large, from the fact that the partially fluorinated polymer dissolves well in a polar solvent such as ether or ketone which is generally available even though the fluorine-containing cyclic olefin polymer. These are the structural characteristics of the fluorine-containing cyclic olefin polymer represented by General Formula (1) of the present invention, and as is obvious from test results described in examples, the effects as described above are able to be exhibited on the basis of the characteristics.

In this embodiment, the optical film having optical properties of this embodiment or an optical film in which these optical films are laminated is able to be suitably obtained by using a manufacturing method of the fluorine-containing cyclic olefin polymer and a manufacturing method of the optical film described below.

[Manufacturing Method of Fluorine-Containing Cyclic Olefin Polymer]

In this embodiment, the fluorine-containing cyclic olefin polymer formed of at least one repeating structural unit substantially represented by General Formula (1) is able to be manufactured by chain transfer polymerization described below. Accordingly, the fluorine-containing cyclic olefin polymer which is a raw material of an optical film or an optical lamination film having optical properties of this embodiment is able to be suitably obtained. Even when the same monomer is used, and the same component ratio of the configuration unit in the resin or the like is used, by optimizing manufacturing conditions as in the present invention, the optical film having the optical properties of this embodiment is able to be obtained.

In this embodiment, according to the method described above, the fluorine-containing cyclic olefin polymer of which the molecular weight distribution (Mw/Mn) is generally in a range of 1.3 to 5.0, is preferably in a range of 1.5 to 4.5, and is more preferably in a range of 1.7 to 4.0 is able to be obtained, and the optical film formed of the polymer described above is able to be stretched and oriented with suitable melt molding properties and melt stretching properties, and thus is able to express a phase difference. In contrast, in a fluorine-containing cyclic olefin polymer having a narrow molecular weight distribution which is obtained by living polymerization without performing a chain transfer reaction, it is difficult to obtain molecular orientation due to the entanglement of polymer chains, and an optical film obtained from the polymer described above has insufficient phase difference-expressing properties.

Specifically, a cyclic olefin monomer represented by General Formula (3) described below is subjected to chain transfer polymerization by using a ring-opening metathesis polymerization catalyst, and an olefin part of a main chain of a polymer to be obtained is hydrogenated, and thus a fluorine-containing cyclic olefin polymer is able to be synthesized.

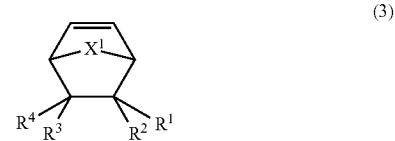

(3)

In Formula (3), $R^1$ to $R^4$, and $X^1$ are identical to those described in Formula (1).

However, the cyclic olefin monomer represented by General Formula (3) does not include an aspect in which $R^1$ to $R^4$ providing the structural unit as exemplified in General Formula (2) are laminated to each other to include a plurality of cyclic structures.

Furthermore, monomers other than the cyclic olefin monomer represented by General Formula (3) may be included within a range not impairing the effect of this embodiment.

The ring-opening metathesis polymerization catalyst used in the polymerization of the cyclic olefin monomer is not limited insofar as the catalyst is able to perform ring-opening metathesis polymerization, and as the ring-opening metathesis polymerization catalyst, for example, a tungsten-based alkylidene catalyst such as W(N-2,6-Pr$^i_2$C$_6$H$_3$)(CHBu$^t$)(OBu$^t$)$_2$, W(N-2,6-Pr$^i_2$C$_6$H$_3$)(CHBu$^t$)(OCMe$_2$CF$_3$)$_2$, W(N-2,6-Pr$^i_2$C$_6$H$_3$)(CHBu$^t$)(OCMe(CF$_3$)$_2$)$_2$, W(N-2,6-Pr$^i_2$C$_6$H$_3$)(CHBu$^t$)(OC(CF$_3$)$_3$)$_2$, W(N-2,6-Me$_2$C$_6$H$_3$)(CH- $Bu^t)(OC(CF_3)_3)_2$, $W(N-2,6-Pr^i{}_2C_6H_3)(CHCMe_2Ph)(OBu^t)_2$, $W(N-2,6-Pr^i{}_2C_6H_3)(CHCMe_2Ph)(OCMe_2CF_3)_2$, $W(N-2,6-Pr^i{}_2C_6H_3)(CHCMe_2Ph)(OCMe(CF_3)_2)_2$, $W(N-2,6-Pr^i{}_2C_6H_3)(CHCMe_2Ph)(OC(CF_3)_3)_2$, $W(N-2,6-Me_2C_6H_3)(CHCHCMePh)(OBu^t)_2(PR_3)$, or $W(N-2,6-Me_2C_6H_3)(CHCHCMe_2)(OBu^t)_2(PR_3)$, $W(N-2,6-Me_2C_6H_3)(CHCHCPh_2)(OBu^t)_2(PR_3)$, $W(N-2,6-Me_2C_6H_3)(CHCHCMePh)(OCMe_2CF_3)_2(PR_3)$, $W(N-2,6-Me_2C_6H_3)(CHCHCMe_2)(OCMe_2CF_3)_2(PR_3)$, $W(N-2,6-Me_2C_6H_3)(CHCHCPh_2)(OCMe_2CF_3)_2(PR_3)$, $W(N-2,6-Me_2C_6H_3)(CHCHCMePh)(OCMe(CF_3)_2)_2(PR_3)$, $W(N-2,6-Me_2C_6H_3)(CHCHCMe_2)(OCMe(CF_3)_2)_2(PR_3)$, $W(N-2,6-Me_2C_6H_3)(CHCHCPh_2)(OCMe(CF_3)_2)_2(PR_3)$, $W(N-2,6-Me_2C_6H_3)(CHCHCMePh)(OC(CF_3)_3)_2(PR_3)$, $W(N-2,6-Me_2C_6H_3)(CHCHCMe_2)(OC(CF_3)_3)_2(PR_3)$, $W(N-2,6-Me_2C_6H_3)(CHCHCPh_2)(OC(CF_3)_3)_2(PR_3)$, $W(N-2,6-Pr^i{}_2C_6H)(CHCHCMePh)(OCMe_2CF_3)_2(PR_3)$, $W(N-2,6-Pr^i{}_2C_6H_3)(CHCHCMePh)(OCMe(CF_3)_2)_2(PR_3)$, $W(N-2,6-Pr^i{}_2C_6H_3)(CHCHCMePh)(OC(CF_3)_3)_2(PR_3)$, $W(N-2,6-Pr^i{}_2C_6H)(CHCHCMePh)(OPh)_2(PR_3)$, or $W(N-2,6-Me_2C_6H_3)(CHCHCMePh)(OBu^t)_2(Py)$, $W(N-2,6-Me_2C_6H_3)(CHCHCMe_2)(OBu^t)_2(Py)$, $W(N-2,6-Me_2C_6H_3)(CHCHCPh_2)(OBu^t)_2(Py)$, $W(N-2,6-Me_2C_6H_3)(CHCHCMePh)(OCMe_2CF_3)_2(Py)$, $W(N-2,6-Me_2C_6H_3)(CHCHCMe_2)(OCMe_2CF_3)_2(Py)$, $W(N-2,6-Me_2C_6H_3)(CHCHCPh_2)(OCMe_2CF_3)_2(Py)$, $W(N-2,6-Me_2C_6H_3)(CHCHCMePh)(OCMe(CF_3)_2)_2(Py)$, $W(N-2,6-Me_2C_6H_3)(CHCHCMe_2)(OCMe(CF_3)_2)_2(Py)$, $W(N-2,6-Me_2C_6H_3)(CHCHCPh_2)(OCMe(CF_3)_2)_2(Py)$, $W(N-2,6-Me_2C_6H_3)(CHCHCMePh)(OC(CF_3)_3)_2(Py)$, $W(N-2,6-Me_2C_6H_3)(CHCHCMe_2)(OC(CF_3)_3)_2(Py)$, $W(N-2,6-Me_2C_6H_3)(CHCHCPh_2)(OC(CF_3)_3)_2(Py)$, $W(N-2,6-Pr^i{}_2C_6H_3)(CHCHCMePh)(OCMe_2CF_3)_2(Py)$, $W(N-2,6-Pr^i{}_2C_6H_3)(CHCHCMePh)(OCMe(CF_3)_2)_2(Py)$, $W(N-2,6-Pr^i{}_2C_6H_3)(CHCHCMePh)(OC(CF_3)_3)_2(Py)$, and $W(N-2,6-Pr^i{}_2C_6H_3)(CHCHCMePh)(OPh)_2(Py)$, a molybdenum-based alkylidene catalyst such as $Mo(N-2,6-Pr^i{}_2C_6H_3)(CHBu^t)(OBu^t)_2$, $Mo(N-2,6-Pr^i{}_2C_6H_3)(CHBu^t)(OCMe_2CF_3)_2$, $Mo(N-2,6-Pr^i{}_2C_6H_3)(CHBu^t)(OCMe(CF_3)_2)_2$, $Mo(N-2,6-Pr^i{}_2C_6H_3)(CHBu^t)(OC(CF_3)_3)_2$, $Mo(N-2,6-Me_2C_6H_3)(CHBu^t)(OC(CF_3)_3)_2$, $Mo(N-2,6-Pr^i{}_2C_6H_3)(CHCMe_2Ph)(OCMe_3)_2$, $Mo(N-2,6-Pr^i{}_2C_6H_3)(CHCMe_2Ph)(OCMe_2CF_3)_2$, $Mo(N-2,6-Pr^i{}_2C_6H_3)(CHCMe_2Ph)(OCMe(CF_3)_2)_2$, $Mo(N-2,6-Pr^i{}_2C_6H_3)(CHCMe_2Ph)(OC(CF_3)_3)_2$, $Mo(N-2,6-Me_2C_6H_3)(CHCMe_2Ph)(OC(CF_3)_3)_2$, $Mo(N-2,6-Pr^i{}_2C_6H_3)(CHCMe_2Ph)(OBu^t)_2(PR_3)$, $Mo(N-2,6-Pr^i{}_2C_6H_3)(CHCMe_2Ph)(OCMe_2CF_3)_2(PR_3)$, $Mo(N-2,6-Pr^i{}_2C_6H_3)(CHCMe_2Ph)(OCMe(CF_3)_2)_2(PR_3)$, $Mo(N-2,6-Pr^i{}_2C_6H_3)(CHCMe_2Ph)(OC(CF_3)_3)_2(PR_3)$, $Mo(N-2,6-Me_2C_6H_3)(CHCMe_2Ph)(OC(CF_3)_3)_2(PR_3)$, $Mo(N-2,6-Pr^i{}_2C_6H_3)(CHCMe_2Ph)(OBu^t)_2(Py)$, $Mo(N-2,6-Pr^i{}_2C_6H_3)(CHCMe_2Ph)(OCMe_2CF_3)_2(Py)$, $Mo(N-2,6-Pr^i{}_2C_6H_3)(CHCMe_2Ph)(OCMe(CF_3)_2)_2(Py)$, $Mo(N-2,6-Pr^i{}_2C_6H_3)(CHCMe_2Ph)(OC(CF_3)_3)_2(Py)$, and $Mo(N-2,6-Me_2C_6H_3)(CHCMe_2Ph)(OC(CF_3)_3)_2(Py)$ (here, in the formula described above, $Pr^i$ represents an iso-propyl group, R represents an alkyl group such as a methyl group and an ethyl group, or an alkoxy group such as a methoxy group and an ethoxy group, $Bu^t$ represents a tert-butyl group, Me represents a methyl group, Ph represents a phenyl group, and Py represents a pyridine group), a ruthenium-based alkylidene catalyst such as $Ru(CHCHCPh_2)(PPh_3)_2Cl_2$ (here, in the formula, Ph represents a phenyl group) are able to be included and are able to be suitably used. In addition, these ring-opening metathesis polymerization catalysts may be independently used, or two or more thereof may be used in combination.

On the other hand, in addition to the ring-opening metathesis polymerization catalysts described above, an organic transition metal complex, a transition metal halide or a transition metal oxide, and a ring-opening metathesis polymerization catalyst formed by being combined with a Lewis acid as a cocatalyst are able to be used, but polymerization catalyst activity with respect to a polarity monomer is low, and is not industrially preferable.

In the ring-opening metathesis polymerization of the cyclic olefin monomer, when a transition metal alkylidene catalyst of tungsten, molybdenum, ruthenium, or the like is used, as a molar ratio between the cyclic olefin monomer and the ring-opening metathesis polymerization catalyst, the monomer is generally 100 mol to 30,000 mol, and is preferably 1,000 mol to 20,000 mol with respect to 1 mol of the transition metal alkylidene catalyst.

By using the ring-opening metathesis polymerization catalyst in the amount described above, an influence on the color phase of the optical film is suppressed, absorption of visible light is suppressed, and thus the optical film having excellent transparency is able to be obtained.

Further, in order to control the molecular weight, and the distribution thereof to be in the range described above, olefin is able to be used as a chain transfer agent. As the olefin, for example, α-olefin such as ethylene, propylene, 1-butene, 1-pentene, 1-hexene, and 1-octene or fluorine-containing olefin thereof is included, and silicon-containing olefin such as vinyl trimethyl silane, allyl trimethyl silane, allyl triethyl silane, and allyl triisopropyl silane or fluorine- and silicon-containing olefin thereof is included, and as diene, non-conjugated diene such as 1,4-pentadiene, 1,5-hexadiene, and 1,6-heptadiene or fluorine-containing non-conjugated diene thereof is included. Further, these olefins, fluorine-containing olefins, or dienes may be independently used, or two or more thereof may be used in combination.

As the used amount of these olefins, fluorine-containing olefins, or dienes described above, the olefin or the diene is generally in a range of 0.001 mol to 1,000 mol, and is preferably in a range of 0.01 mol to 100 mol with respect to 1 mol of the cyclic olefin monomer. In addition, the olefin or the diene is generally in a range of 0.1 mol to 1,000 mol, and is preferably in a range of 1 mol to 500 mol with respect to 1 mol of the transition metal alkylidene catalyst.

In addition, the ring-opening metathesis polymerization of the cyclic olefin monomer may or may not use a solvent, and in particular, as a solvent to be used, ethers such as tetrahydrofurane, diethyl ether, dibutyl ether, dimethoxy ethane, or dioxane, esters such as ethyl acetate, propyl acetate or butyl acetate, aromatic hydrocarbon such as benzene, toluene, xylene, or ethyl benzene, aliphatic hydrocarbon such as pentane, hexane, or heptane, aliphatic cyclic hydrocarbon such as cyclopentane, cyclohexane, methyl cyclohexane, dimethyl cyclohexane, or decalin, halogenated hydrocarbon such as methylene dichloride, dichloroethane, dichloroethylene, tetrachloroethane, chlorobenzene, or trichlorobenzene, fluorine-containing aromatic hydrocarbon such as fluorobenzene, difluorobenzene, hexafluorobenzene, trifluoromethyl benzene, and meta-xylene hexafluoride, fluorine-containing aliphatic hydrocarbon such as perfluorohexane, fluorine-containing aliphatic cyclic hydrocarbon such as perfluorodecalin, and fluorine-containing ethers such as perfluoro-2-butyl tetrahydrofurane are included, and two or more thereof may be used in combination.

In the ring-opening metathesis polymerization of the cyclic olefin monomer, the concentration of the cyclic olefin monomer with respect to a monomer solution is different according to the reactivity of the monomer and solubility with respect to the polymerization solvent, and the ring-opening metathesis polymerization of the cyclic olefin monomer is able to be performed in conditions where the concentration of the cyclic olefin monomer is generally in a range of 5 mass % to 100 mass %, and is preferably in a range of 10 mass % to 60 mass %, a reaction temperature is generally in a range of −30° C. to 150° C., and is preferably in a range of 30° C. to 100° C., and a reaction time is generally in a range of 10 minutes to 120 hours, and is preferably in a range of 30 minutes to 48 hours. Further, the reaction stops by using aldehydes such as butyl aldehyde, ketones such as acetone, alcohols such as methanol, and a devitalizing agent such as water, and thus a polymer solution is able to be obtained.

The cyclic olefin polymer of this embodiment is obtained by subjecting the olefin part of the main chain of the polymer obtained by performing ring-opening metathesis polymerization with respect to the cyclic olefin monomer to a hydrogenation reaction using a catalyst. In addition, the hydrogenation catalyst may be either a homogeneous metal complex catalyst or a heterogeneous metal supported catalyst insofar as the hydrogenation catalyst is able to hydrogenate the olefin part of the main chain of the polymer without causing a hydrogenation reaction of the solvent to be used, as the homogeneous metal complex catalyst, for example, chlorotris(triphenyl phosphine) rhodium, dichlorotris(triphenyl phosphine) osmium, dichlorohydride bis(triphenyl phosphine) iridium, dichlorotris(triphenyl phosphine) ruthenium, dichlorotetrakis(triphenyl phosphine) ruthenium, chlorohydride carbonyl tris(triphenyl phosphine) ruthenium, dichlorotris(trimethyl phosphine) ruthenium, and the like are included, and as the heterogeneous metal supported catalyst, for example, activated carbon supported palladium, alumina supported palladium, activated carbon supported rhodium, alumina supported rhodium, activated carbon supported ruthenium, alumina supported ruthenium, and the like are included. These hydrogenated catalysts are able to be independently used, or two or more thereof are able to be used in combination.

When a known heterogeneous or homogeneous hydrogenation catalyst is used at the time of hydrogenating the olefin part of the main chain, as the used amount of the hydrogenation catalyst, a metal component in the hydrogenation catalyst is generally $5 \times 10^{-4}$ parts by mass to 100 parts by mass, and is preferably $1 \times 10^{-2}$ parts by mass to 30 parts by mass with respect to 100 parts by mass of the polymer before being hydrogenated.

The solvent used in the hydrogenation is not particularly limited insofar as the cyclic olefin polymer is dissolved and the solvent itself is not hydrogenated, and as the solvent, for example, ethers such as tetrahydrofurane, diethyl ether, dibutyl ether, and dimethoxy ethane, esters such as ethyl acetate, propyl acetate, or butyl acetate, aromatic hydrocarbon such as benzene, toluene, xylene, ethyl benzene, aliphatic hydrocarbon such as pentane, hexane, and heptane, an aliphatic cyclic hydrocarbon such as cyclopentane, cyclohexane, methyl cyclohexane, dimethyl cyclohexane, and decalin, halogenated hydrocarbon such as methylene dichloride, chloroform, dichloroethane, dichloroethylene, tetrachloroethane, chlorobenzene, and trichlorobenzene, fluorine-containing aromatic hydrocarbon such as fluorobenzene, difluorobenzene, hexafluorobenzene, trifluoromethyl benzene, and meta-xylene hexafluoride, fluorine-containing aliphatic hydrocarbon such as perfluorohexane, fluorine-containing aliphatic cyclic hydrocarbon such as perfluorodecalin, fluorine-containing ethers such as perfluoro-2-butyl tetrahydrofurane, and the like are included, and two or more thereof may be used in combination.

The hydrogenation reaction of the olefin part of the main chain is performed under conditions where hydrogen pressure is in a range of normal pressure to 30 MPa, is preferably in a range of 0.5 MPa to 20 MPa, and is particularly preferably in a range of 2 MPa to 15 MPa, and a reaction temperature is generally in a range of 0° C. to 300° C., is preferably in a range of the room temperature to 250° C., and is particularly preferably in a range of 50° C. to 200° C. A hydrogenation reaction method is not particularly limited, and as the hydrogenation reaction method, for example, a method in which the catalyst is dispersed or dissolved in the solvent, a method in which a column or the like is filled with the catalyst as a stationary phase, and the polymer solution is made to flow therethrough, and the like are included.

Further, the hydrogenation of the olefin part of the main chain may be performed by precipitating a polymerization solution of the cyclic olefin polymer before being hydrogenated in a poor solvent, thereby isolating the polymer, and then by dissolving the polymer in a solvent again, or may be performed by using the hydrogenated catalyst described above without isolating the polymer from the polymerization solution, and is not particularly limited.

In addition, the hydrogenation ratio of the olefin part of the cyclic olefin polymer is greater than or equal to 50%, is preferably 70% to 100%, and is more preferably 90% to 100%. When the hydrogenation ratio is less than 50%, the heat resistance or the weather resistance of the olefin part is degraded due to oxidation or light absorption deterioration.

In this embodiment, a method of collecting the cyclic olefin polymer from the polymer solution after being hydrogenated is not particularly limited, and as the method, for example, a method in which a reaction solution is discharged to a poor solvent under stirring, a method in which the polymer is precipitated by using a method such as steam stripping in which steam is sprayed into the reaction solution, and the polymer is collected by using a method such as filtration, centrifugal separation, and decantation, a method in which the solvent is evaporated and removed from the reaction solution by heat, and the like are included. In addition, when the hydrogenation reaction is performed by using the heterogeneous metal supported catalyst, a synthetic liquid is filtered, and the metal supported catalyst is filtered, and then the cyclic olefin polymer is able to be collected by the method described above. Furthermore, a catalyst component having a large particle diameter may be precipitated in advance in the polymer solution by using a method such as decantation or stretching separation, a supernatant liquid may be sampled, a solution in which the catalyst component has been roughly collected may be filtered, and thus the cyclic olefin polymer may be collected by using the method described above.

Furthermore, the obtained polymer solution is able to be subjected to fine filtration as described below. In this case, in the manufacturing method of the optical film described below, Step b may not be repeated.

[Manufacturing Method of Optical Film]

The manufacturing method of the optical film of this embodiment, for example, is able to have the following steps.

Step a: A varnish containing the fluorine-containing cyclic olefin polymer described above is prepared.

Step b: The varnish is passed through a filter including a hole having a hole diameter of less than or equal to 0.5 μm, and is subjected to fine filtration.

Step c: A film is formed from the filtered varnish.

Step d: The film is stretched.

(Step a)

First, the fluorine-containing cyclic olefin polymer is dissolved in an organic solvent, and the varnish is prepared.

The organic solvent is not particularly limited, and as the organic solvent, for example, fluorine-containing aromatic hydrocarbon such as meta-xylene hexafluoride, benzotrifluoride, fluorobenzene, difluorobenzene, hexafluorobenzene, trifluoromethyl benzene, and bis(trifluoromethyl)benzene, fluorine-containing aliphatic hydrocarbon such as perfluorohexane, and perfluorooctane, fluorine-containing aliphatic cyclic hydrocarbon such as perfluorodecalin, fluorine-containing ethers such as perfluoro-2-butyl tetrahydrofurane, halogenated hydrocarbon such as chloroform, chlorobenzene, and trichlorobenzene, ethers such as tetrahydrofurane, dibutyl ether, 1,2-dimethoxy ethane, and dioxane, esters such as ethyl acetate, propyl acetate, and butyl acetate, ketones such as methyl ethyl ketone, methyl isobutyl ketone, and cyclohexanone, and the like are able to be included. Among them, the organic solvent is able to be selected in consideration of solubility and film forming properties, and these organic solvents may be independently used or two or more thereof may be used in combination. In particular, a solvent having a boiling point of higher than or equal to 70° C. in atmospheric pressure is preferable from a viewpoint of the film forming properties. When the boiling point of the solvent is low, an evaporation rate is high, the solvent is partially dried at the time of performing coating, and thus film thickness accuracy is degraded or a fish eye is generated on a film surface.

In addition, the concentration of the fluorine-containing cyclic olefin polymer to be dissolved is generally in a range of 1.0 mass % to 99.0 mass %, is preferably in a range of 5.0 mass % to 90.0 mass %, and is more preferably in a range of 10.0 mass % to 80.0 mass %. The concentration may be selected in consideration of the solubility of the polymer, adaptability with respect to a filtering process, film forming properties, and the thickness of a film.

Further, in this embodiment, other known components may be added as necessary within a range of not impairing the film properties. As the other component, a modifier such as an anti-aging agent, a leveling agent, a wettability improving agent, a surfactant agent, and a plasticizer, a stabilizer such as a ultraviolet absorbing agent, an antiseptic agent, and an antifungal agent, a photosensitizer, a silane coupling agent, and the like are included.

(Step b)

Next, the varnish prepared in Step a may be filtered by a filter including a hole of which a hole diameter is generally less than or equal to 0.5 μm, is preferably less than or equal to 0.1 μm, is more preferably less than or equal to 0.05 μm, and is even more preferably less than or equal to 0.02 μm, and thus may be subjected to the fine filtration.

The process of the fine filtration may be a multi-stage process in which the polymer solution is fed from a filter having a large hole diameter to a filter having a small hole diameter, or may be a single process in which the varnish is directly fed to a filter having a small hole diameter. The material of the filter may be an organic material such as TEFLON (tetrafluoroethylene fluorocarbon polymers), PP, PES, and cellulose, or may be an inorganic material such as a glass fiber, and metal, and is preferably selected from a viewpoint of varnish properties, and process adaptability.

In addition, a method of feeding the varnish to the filter may be a method using a pressure difference, or may be a method of feeding the varnish to the filter by mechanical driving through a screw. When the pressure difference is used, the pressure difference is able to be selected according to the process within a range of satisfying the filtration performance of the filter, a difference ($\Delta P$) between a pressure applied to the liquid surface of the varnish and the pressure of the lower portion of the filter is generally less than or equal to 3.0 MPa, is preferably less than or equal to 1.0 MPa, and is more preferably less than or equal to 0.8 MPa, and even when the pressure is in the range of satisfying the filtration performance of the filter, it is preferable that the difference ($\Delta P$) between the pressure applied to the liquid surface of the varnish and the pressure of the lower portion of the filter is further decreased, and the difference ($\Delta P$) is generally less than or equal to 0.5 MPa, is more preferably less than or equal to 0.3 MPa, and is even more preferably less than or equal to 0.1 MPa. Further, when the varnish is fed by the mechanical driving through a pump, various conditions such as the shape of the pump, torque, and the number of rotations are set by adjusting the pressure difference applied to the filter to be in the range described above. The temperature of the fine filtration is selected within a range in which the filter performance, solution viscosity, and the solubility of the polymer are considered, and is generally in a range of $-10°$ C. to $200°$ C., is preferably in a range of $0°$ C. to $150°$ C., and is more preferably in a range of the room temperature to $100°$ C.

Accordingly, it is possible to considerably reduce insoluble matter, gel, foreign substances, and the like from the polymer, and foreign substances of greater than or equal to 0.5 μm are rarely observed. The raw film before being stretched in Step c is prepared from the varnish, and thus the film is able to be formed having excellent film thickness accuracy and suppressed occurrence of defects such as a fish eye. Further, the varnish which is subjected to high-definition fine filtration by using a filter having a fine hole smaller than a visible light wavelength region is used, and thus fine foreign substances in a film surface, or the scattering of light which occurs due to an aggregate of foreign substances, and degradation of transparency due to absorption are able to be suppressed. Accordingly, in the stretching step of the film of Step d, the entire surface of the film is able to be evenly stretched and oriented, and thus surface roughness is suppressed, and the optical film or a wavelength plate having a desired phase difference is able to be obtained without having phase difference unevenness.

Furthermore, when pelletizing is performed, a filtration step using a filter (filtration accuracy of 0.5 μm) is performed at the time of feeding a melting resin having a high viscosity. In this filtration step, a temperature and a pressure are extremely high, and the material of a filter to be used is sintered metal or the like. For this reason, when insoluble matter, gel, foreign substances, and the like included in the melting resin having a high viscosity have elasticity under conditions of a high temperature and a high pressure, insoluble matter, gel, foreign substances, and the like may pass through the filter by being deformed. In contrast, when insoluble matter, gel, foreign substances, and the like are in a solution state such as the varnish, clogging may occur in the filter, but the insoluble matter, the gel, the foreign substances, and the like do not pass through the filter by being deformed. Thus, the filter used for pelletizing for filtering the melting resin having a high viscosity under conditions of a high temperature and a high pressure, and the filter filtering a solution (the varnish) having a comparatively low viscosity are different in usage and effect thereof.

(Step c)

As described above, the varnish is filtered, and then the film is formed from the varnish.

As a film forming method, a solution casting method is able to be included. Here, as the solution, the varnish described above is able to be used.

When the film is manufactured by using the solution casting method, first, the polymer solution (the varnish) is applied onto a base material by using a method such as table coating, spin coating, dip coating, die coating, spray coating, bar coating, roll coating, and curtain flow coating, and thus the film is formed. As the base material, a metal material such as stainless steel, and silicon, an inorganic material such as glass, and quartz, a resin material such as a polyimide, a polyamide, a polyester, a polycarbonate, polyphenylene ether, polyphenylene sulfide, a polyacrylate, a polymethacrylate, a polyacrylate, an epoxy resin, and a silicone resin, and the like are able to be included.

The drying of the coated film may be performed by placing the base material on which the solution is casted on a heating plate, and by drying the base material using heat, may be performed by putting the base material on which the solution is casted into a heated drying furnace, and by drying the base material using heat, may be performed by applying hot air of heated gas such as air or nitrogen to the coated film, or may be performed by using a process in which these drying methods are combined. The temperature at the time of the drying is generally in a range of 10° C. to 250° C., is preferably in a range of 20° C. to 220° C., and is more preferably in a range of 30° C. to 200° C., and is selected in consideration of the properties of the varnish, and the thickness of the film. In addition, the coated film may be dried by setting the drying temperature in a multi-stage of greater than or equal to two temperatures. The drying time of the coated film is able to be selected from conditions in consideration of the boiling point of a varnish solvent, the thickness of the film, and processing requisites. Accordingly, the film is formed on the base material.

The film may be peeled off from the base material by attaching commercially-supplied tape to an end portion of the film, and by applying a stress thereto, or may be peeled off from the base material by bringing a liquid such as water, and a solvent into contact with a contact interface between the film and the base material, and by using the difference in surface tension between the surface of the base material and the contact surface of the film.

The thickness of the film obtained in this way is generally in a range of 10 μm to 1000 μm, is preferably in a range of 20 μm to 500 μm, and is more preferably in a range of 30 μm to 200 μm, and the thickness of the film is able to be set in consideration of an influence due to the stretching step of the film of Step d, or an influence at the time of laminating the stretched film.

Furthermore, in a manufacturing process of the fluorine-containing cyclic olefin polymer, when the polymer solution is subjected to the fine filtration, the polymer is acquired by using the method described above, or the polymer is acquired in the shape of a pellet by including a pelletizing step, and thus the film is able to be prepared by using a melt molding method. In this case, Step c is able to be performed without performing Step a and Step b described above.

When the film is manufactured by using the melt molding method, a method of forming a film through a T die by using a melt kneader, an inflation method, and the like are used. When the film is manufactured by being melted and extruded by the T die, for example, the cyclic olefin polymer to which an additive is mixed as necessary is put into an extruder, and melted and kneaded at a temperature which is generally 50° C. to 200° C. higher than the glass transition temperature, preferably 80° C. to 150° C. higher than the glass transition temperature. The melted polymer is extruded from the T die, and cooled by using a cooling roll or the like, and thus is processed into the film.

The thickness of the film obtained in this way is generally in a range of 10 μm to 1000 μm, is preferably in a range of 20 μm to 500 μm, and is more preferably in a range of 30 μm to 200 μm, and the thickness of the film is able to be set in consideration of the influence due to the stretching step of the film of Step d or the influence at the time of laminating the stretched film.

(Step d)

Then, the film obtained in Step c is stretched, and thus the optical film of this embodiment is obtained.

First, the film obtained in Step c is exposed at a temperature obtained by adding a temperature which is generally in a range of −20° C. to 150° C., is preferably in a range of −5° C. to 110° C., and is more preferably in a range of 0° C. to 80° C. to the glass transition temperature of the fluorine-containing cyclic olefin polymer for generally 0.01 minutes to 30 minutes, preferably 0.05 minutes to 20 minutes, and more preferably 0.1 minutes to 10 minutes, and thus a preheating step is able to be performed. Accordingly, heat unevenness over the entire surface of the film is solved, and thus the film is able to be evenly stretched.

Then, the preheated film is stretched in the following conditions.

A stretching temperature may be a temperature obtained by adding a temperature which is generally in a range of −20° C. to 150° C., preferably in a range of −5° C. to 110° C., and is more preferably in a range of 0° C. to 80° C. to the glass transition temperature of the fluorine-containing cyclic olefin polymer. A stretching magnification is generally in a range of 1.05 times to 10 times, is preferably in a range of 1.10 times to 6.0 times, and is more preferably in a range of 1.10 times to 3.0 times. In addition, in a case of biaxial-stretching, an axis in which the stretching is performed at a high magnification is set to an MD axis, an axis in which the stretching is performed at a low magnification is set to a TD axis, and a ratio of an MD axial magnification/a TD axial magnification as the stretching magnification is generally in a range of 1.05 times to 10 times, is preferably in a range of 1.10 times to 6.0 times, and is more preferably in a range of 1.10 times to 3.0 times. A relationship between the stretching temperature and the magnification may be adjusted to be a relationship suitable for a λ/4 wavelength plate or a λ/2 wavelength plate, and is preferably selected in consideration of the flow of the resin, a heat stretching method of a device, productivity, and the like. Further, in the stretching step, the film to be stretched is typically an unstretched film, and a film which is stretched in advance may be stretched again in the stretching step.

A stretching method and conditions of the film are not particularly limited, and as the stretching method, for example, a method in which monoaxial stretching is performed in a vertical direction by using a difference in a circumferential velocity between rolls, a method in which the monoaxial stretching is performed in a horizontal axis direction by using a tenter, a biaxial-stretching method such as a simultaneous biaxial-stretching method in which a clip gripping both sides of the film is opened, the stretching is performed in the vertical direction, and thus the film is stretched in a horizontal direction according to a spreading angle of a guide rail, and a sequential biaxial-stretching method in which the stretching is performed in the vertical direction by using a difference in a circumferential velocity between the rolls, and both end portions of the film are gripped by the clip and are stretched in the horizontal direction by using the tenter, a method in which diagonal stretching is performed by using a tenter stretching machine pulling the film at a velocity different in right and left in vertical and horizontal directions or by using a tenter stretching machine having the same distance of pulling and moving the film at the same velocity in right and left in the horizontal or the vertical direction and having a different distance of fixing or moving a stretching angle, and the like are included.

Further, in Step c, when the film is prepared by using the melt molding method, the optical film of this embodiment may be manufactured by a continuous method of Step c and Step d in which the polymer is cooled by the cooling roll or the like, and the film is fed again to the preheating step, and thus the stretching is performed by using the method described above.

<Optical Film>

In the optical film having low wavelength dispersibility of this embodiment, which is obtained by the manufacturing method as described above, a phase difference at a wavelength of 550 nm is greater than or equal to 50 nm, wavelength dispersibility represented by a ratio Re (400 nm)/Re (550 nm) of a phase difference Re (400 nm) at a wavelength of 400 nm to a phase difference Re (550 nm) at a wavelength of 550 nm is generally 1.00 to 1.05, and is preferably 1.00 to 1.03. Further, the wavelength dispersibility is more preferably 1.00 to 1.02, is further more preferably 1.00 to 1.01, and is particularly preferably 1.00, and in this optical film, wavelength dispersibility represented by a ratio Re (400 nm)/Re (800 nm) of a phase difference Re (400 nm) at a wavelength of 400 nm to a phase difference Re (800 nm) at a wavelength of 800 nm is generally 1.00 to 1.05, and is preferably 1.00 to 1.03. Further, the wavelength dispersibility is preferably 1.00 to 1.02, is more preferably 1.00 to 1.01, and is particularly preferably 1.00.

An optical film of visible light is required to express a phase difference function with respect to visible light by setting the phase difference at the wavelength of 550 nm to be greater than or equal to 50 nm, and to satisfy these two wavelength dispersibilities. As a result of intensive studies of the present inventors, it has been found that the optical film which includes a fluorine atom in the repeating structural unit represented by General Formula (1) and is formed of the fluorine-containing cyclic olefin polymer having one 5-membered ring structure in a main chain expresses a high phase difference by stretching and orienting, and expresses low wavelength dispersibility, and thus the present invention has been completed. In contrast, the repeating structural unit having a plurality of cyclic structures represented by General Formula (2) hinders the phase difference from being expressed, and thus the optical film having a desired phase difference is not able to be obtained. Accordingly, copolymerization between the repeating structural unit having a plurality of cyclic structure represented by General Formula (2) and the repeating structural unit represented by General Formula (1) is not preferable as the material of the phase difference film.

In the optical film of this embodiment, in a range of a light wavelength of 400 nm to 800 nm, the wavelength dispersibility represented by the ratio Re (400 nm)/Re (550 nm) of the phase difference Re (400 nm) at the wavelength of 400 nm to the phase difference Re (550 nm) at the wavelength of 550 nm is generally 1.00 to 1.05, and is preferably 1.00 to 1.03. Further, the wavelength dispersibility is preferably 1.00 to 1.02, is more preferably 1.00 to 1.01, and is particularly preferably 1.00, and the wavelength dispersibility represented by the ratio Re (400 nm)/Re (800 nm) of the phase difference Re (400 nm) at the wavelength of 400 nm to the phase difference Re (800 nm) at the wavelength of 800 nm is generally 1.00 to 1.05, and is preferably 1.00 to 1.03. Further, the wavelength dispersibility is preferably 1.00 to 1.02, is more preferably 1.00 to 1.01, and is particularly preferably 1.00. Thus, as the optical film, it is necessary that the wavelength dispersibility is low in a wide wavelength range.

Further, the optical film having low wavelength dispersibility of this embodiment has transparency of greater than or equal to 92% of the total light transmittance. The transparency is preferably greater than or equal to 93%, is more preferably greater than or equal to 94%, is particularly preferably greater than or equal to 95%. In order to form such a film having high transparency, in the fluorine-containing cyclic olefin polymer represented by General Formula (1), the content rate of the fluorine atom in the repeating structural unit is 30 mass % to 80 mass %, and is preferably 40 mass % to 75 mass %.

Such an optical film having low wavelength dispersibility of this embodiment is able to be used as a λ/4 wavelength plate or a λ/2 wavelength plate.

Specifically, the film formed of the fluorine-containing cyclic olefin polymer including at least one of the repeating structural unit substantially represented by General Formula (1) is stretched monoaxially (in an MD direction), biaxially (in the MD direction and a TD direction), and in a thickness direction by using stretching technology of various methods, and the optical film having an oriented polymer chain is able to be prepared. In order to improve the performance of the image display in the usage of the display material, the λ/4 wavelength plate or the λ/2 wavelength plate is able to be used for improving the homogeneity and the contrast of the display, and for enlarging the viewing angle of the display.

Further, in the λ/4 wavelength plate of the optical film as the phase difference film, the phase difference is generally 140 nm±10 nm, is preferably 140 nm±7 nm, and is more preferably 140 nm±5 nm, at a wavelength of 550 nm having high visibility. In addition, similarly, in the λ/2 wavelength plate, the phase difference is generally 280 nm±20 nm, is preferably 280 nm±10 nm, and is more preferably 280 nm±5 nm, at a wavelength of 550 nm.

In this embodiment, the prepared varnish passes through a filter including a hole of which a hole diameter is generally less than or equal to 0.5 µm, is preferably less than or equal to 0.1 µm, is more preferably less than or equal to 0.05 µm, and is even more preferably less than or equal to 0.02 µm, the fine filtration step is performed, the raw film is manufactured, and the conditions at the time of preparing the stretched film are optimized, and thus phase difference unevenness is able to be suppressed. The phase difference unevenness, for example, may be evaluated by scanning a sample stage, which fixes the film to a measurement device of the phase difference, in the vertical and horizontal directions within a specific range, acquiring phase difference data of a plurality of points, calculating an average value and standard deviation (σ) by numerical analysis, and setting the average value as the phase difference and the standard deviation value with a sign (±) as the phase difference unevenness. The λ/4 wavelength plate of this embodiment is an optical film in which the phase difference unevenness at a wavelength of 550 nm is generally less than or equal to ±0.50 nm/cm$^2$, is preferably less than or equal to ±0.10 nm/cm$^2$, is more preferably less than or equal to ±0.05 nm/cm$^2$, and is particularly preferably less than or equal to ±0.00 nm/cm$^2$. In addition, the λ/2 wavelength plate is an optical film in which the phase difference unevenness at a wavelength of 550 nm is generally less than or equal to ±0.50 nm/cm$^2$, is preferably less than or equal to ±0.10 nm/cm$^2$, is more preferably less than or equal to ±0.05 nm/cm$^2$, and is particularly preferably less than or equal to ±0.00 nm/cm$^2$.

In addition, the fine filtration step is performed, the raw film is manufactured, and the conditions at the time of preparing the stretched film are optimized, and thus surface roughness of the film surface is able to be suppressed. Accordingly, scattered reflection of incident light on the film surface is suppressed, and thus the reflection of the light is able to be reduced. The λ/4 wavelength plate of this embodiment is an optical film in which the reflectance at a wavelength of 550 nm is generally less than or equal to 7.0%, is preferably less than or equal to 6.0%, is more preferably less than or equal to 5.0%, and is particularly preferably less than or equal to 3.0%. The λ/2 wavelength plate is an optical film in which the reflectance at a wavelength of 550 nm is generally less than or equal to 7.0%, is preferably less than or equal to 6.0%, is more preferably less than or equal to 5.0%, and is particularly preferably less than or equal to 3.0%.

Further, in a partial fluorine-containing cyclic olefin polymer which is the raw material of the optical film of this embodiment, a photoelastic constant is less than or equal to ⅕ of a photoelastic constant of an optical film formed of a polycarbonate (PC) which is used as a phase difference film in the related art, and an unnecessary phase difference is rarely generated by fine stress which occurs due to the contraction of the material according to a residual stress strain of laminating at the time of laminating the film, a temperature change, and a humidity change. For this reason, the optical film formed of the fluorine-containing cyclic olefin polymer of this embodiment is able to be preferably used as the phase difference film from a viewpoint of the degree of the occurrence of the phase difference due to the stress strain.

The film thickness of the optical film having low wavelength dispersibility of this embodiment is able to be selected according to the usage, but is not particularly limited, and is generally in a range of 10 μm to 500 μm, is preferably in a range of 20 μm to 300 μm, and is more preferably in a range of 30 μm to 200 μm. In addition, the optical film of this embodiment increases light transmittivity and decreases turbidness (haze) while maintaining low wavelength dispersibility of the λ/4 wavelength plate and the λ/2 wavelength plate, and thus is able to impart an antireflection function to the phase difference film. Accordingly, in a device such as a liquid crystal display or an organic EL display, the size and the weight may be reduced, and bendability may be improved. For this reason, the film thickness of the optical film may be in a range of 0.1 μm to 10 μm, may be preferably in a range of 0.5 μm to 10 μm, and may be preferably in a range of 1.0 μm to 10 μm. Further, the film thickness of the raw film before being stretched is able to be set in consideration of an influence due to the stretching or an influence at the time of laminating the stretched film.

The optical film of this embodiment is able to be used as an optical film (an optical lamination film) obtained by laminating two or more of the stretched films to each other at an angle in which slow axes are not coaxial.

In this optical film, the reverse wavelength dispersibility Re (400 nm)/Re (550 nm) is less than 1.00, is preferably less than 0.98, and is particularly preferably less than 0.96. In the stretched and oriented film, a slow axis is a reference axis which indicates an orientation direction in a state where the polymer chain is oriented, and is observed at the time of measuring the phase difference by using, for example, a retardation measurement device Rets-100 manufactured by Otsuka Electronics Co., Ltd. The phase difference is expressed according to the direction of the slow axis, and is not necessarily coincident with the direction of a stretching axis (stress to be applied) at the time of the stretching. That is, when the film is laminated, the angle is an angle in which the respective slow axes of the films intersect each other, and the stretching axis may not be used as a reference. Therefore, in this embodiment, at the time of laminating the stretched film, it is necessary that the slow axis with respect to the stretching axis is confirmed, and according to the result thereof, the angle of the film to be laminated is adjusted.

In addition, when the stretched films are superposed on the basis of the slow axes, and the angle is changed by intersecting the slow axes from 0° at which the slow axes do not intersect each other but are in a parallel state, the phase difference indicates a periodic change according to the angle in which a first period is n. When the angle is 0° and 180° in which the slow axes do not intersect each other, the phase difference indicates the maximum value which includes the total value of phase difference values of the respective two stretched films, and when the angle is 90° in which the slow axes of the two stretched films are orthogonal to each other, the phase difference indicates the minimum value which includes the value of the difference between the phase differences of the respective two stretched films. Further, as a result of intensive studies, it has been found that as the wavelength dependency of the laminated phase difference film, the phase difference at a specific angle in which two stretched films having positive wavelength dispersibility are laminated has reverse wavelength dispersibility.

In the optical film obtained by laminating two or more stretched films to each other at an angle in which the slow axes of the optical films of this embodiment are not coaxial, the optical film is obtained by laminating two phase difference films having a phase difference ratio Re (400 nm)/Re (550 nm) of 1.00 to 1.05 and positive wavelength dispersibility at an angle of generally 40° to 160°, preferably 50° to 150°, and particularly preferably 55° to 145° in which the respective slow axes intersect each other. Accordingly, the phase difference film having a phase difference ratio Re (400 nm)/Re (550 nm) of less than 1.00 and reverse wavelength dispersibility is able to be obtained.

Further, the optical film having reverse wavelength dispersibility of this embodiment has transparency of greater than or equal to 91% of the total light transmittance. The transparency is preferably greater than or equal to 92%, is more preferably greater than or equal to 93%, and is particularly preferably greater than or equal to 94%. In order to form such a film having high transparency, in the fluorine-containing cyclic olefin polymer represented by General Formula (1), the content rate of the fluorine atom in the repeating structural unit is 30 mass % to 80 mass %, and is preferably 40 mass % to 75 mass %.

In addition, the optical film having reverse wavelength dispersibility of this embodiment is able to be used as a λ/4 wavelength plate or a λ/2 wavelength plate.

The λ/4 wavelength plate or the λ/2 wavelength plate is able to be obtained as follows.

The optical film having low wavelength dispersibility is stretched monoaxially (in the MD direction), biaxially (in the MD direction and the TD direction), and in the thickness direction by using the stretching technology of various methods, the polymer chain is oriented, and thus the stretched film is prepared. When a plurality of stretched films are laminated by allowing optical axes thereof to intersect each other, the wavelength dispersibility of the phase difference is controlled while adjusting the phase difference to be a phase difference expressing a predetermined function. Accordingly, the λ/4 wavelength plate or the λ/2 wavelength plate having a predetermined phase difference over a wide wavelength band such as the entire visible region is able to be prepared.

Further, in the λ/4 wavelength plate formed of the optical film, the phase difference is generally 140 nm±10 nm, is preferably 140 nm±7 nm, and is more preferably 140 nm±5 nm, at a wavelength of 550 nm having high visibility. In addition, similarly, in the λ/2 wavelength plate, the phase difference is generally 280 nm±20 nm, is preferably 280 nm±10 nm, and is more preferably 280 nm±5 nm, at a wavelength of 550 nm.

In this embodiment, the prepared varnish is passed through a filter including a hole of which a hole diameter is generally less than or equal to 0.5 μm, is preferably less than or equal to 0.1 μm, is more preferably less than or equal to 0.05 μm, and is even more preferably less than or equal to 0.02 μm, the fine filtration step is performed, the raw film is manufactured, and the conditions at the time of preparing the stretched film are optimized, and thus phase difference unevenness is able to be suppressed. As described above, the phase difference unevenness is able to be evaluated by calculating the average value and the standard deviation ($\sigma$) by the numerical analysis, and by setting the average value as the phase difference and the standard deviation value with the sign (±) as the phase difference unevenness. The λ/4 wavelength plate of this embodiment is an optical film in which the phase difference unevenness at a wavelength of 550 nm is generally less than or equal to ±0.50 nm/cm$^2$, is preferably less than or equal to ±0.10 nm/cm$^2$, is more preferably less than or equal to ±0.05 nm/cm$^2$, and is particularly preferably less than or equal to ±0.00 nm/cm$^2$. In addition, the λ/2 wavelength plate is an optical film in which the phase difference unevenness at a wavelength of 550 nm is generally less than or equal to ±0.50 nm/cm$^2$, is preferably less than or equal to ±0.10 nm/cm$^2$, is more preferably less than or equal to ±0.05 nm/cm$^2$, and is particularly preferably less than or equal to ±0.00 nm/cm$^2$.

In addition, the fine filtration step is performed, the raw film is manufactured, and the conditions at the time of preparing the stretched film are optimized, and thus surface roughness of the film surface is suppressed, and accordingly, the scattered reflection of the incident light on the film surface is suppressed, and the reflection of the light is able to be reduced, and thus the λ/4 wavelength plate of this embodiment is an optical film in which the reflectance at a wavelength of 550 nm is generally less than or equal to 7.0%, is preferably less than or equal to 6.0%, is more preferably less than or equal to 5.0%, and is particularly preferably less than or equal to 3.0%. The λ/2 wavelength plate is an optical film in which the reflectance at a wavelength of 550 nm is generally less than or equal to 7.0%, is preferably less than or equal to 6.0%, is more preferably less than or equal to 5.0%, and is particularly preferably less than or equal to 3.0%.

In particular, as an optical film for a liquid crystal display or an organic EL display, in the related art, only when a film member configured of two plates including a λ/4 wavelength plate and a λ/2 wavelength plate is used as an antireflection function of preventing outside light from being reflected, a function as the λ/4 wavelength plate having a wide band is obtained, but by using the λ/4 wavelength plate having reverse wavelength dispersibility and high transparency of this embodiment, visibility as the λ/4 wavelength plate having a wide band is improved, and the number of film members is able to be set to one, and thus the λ/4 wavelength plate of this embodiment is effective for reducing the cost and reducing the thickness of a module.

The phase difference of each of the stretched films which are laminated in order to prepare the λ/4 wavelength plate and the λ/2 wavelength plate having reverse wavelength dispersibility is generally in a range of 50 nm to 1000 nm, is preferably in a range of 55 nm to 800 nm, and is more preferably in a range of 60 nm to 600 nm, and thus a plurality of films are able to be laminated. Accordingly, the strength of the film is also able to be improved. In the range of the phase difference, the haze of the film is generally less than or equal to 0.6%, is preferably less than or equal to 0.5%, and is particularly preferably less than or equal to 0.3%.

The film thickness of the optical film having reverse wavelength dispersibility of this embodiment is able to be selected according to the usage, but is not particularly limited, and is generally in a range of 10 μm to 500 μm, is preferably in a range of 20 μm to 300 μm, and is more preferably in a range of 30 μm to 200 μm. In addition, the light transmittivity increases and the turbidness (the haze) decreases while maintaining the reverse wavelength dispersibility as the λ/4 wavelength plate and the λ/2 wavelength plate of the optical film of this embodiment, and thus it is possible to impart the antireflection function to the phase difference film. Accordingly, in the device such as the liquid crystal display or the organic EL display, the size and the weight may be reduced, and bendability may be improved. For this reason, the film thickness of the optical film may be in a range of 0.1 μm to 10 μm, may be preferably in a range of 0.5 μm to 10 μm, and may be preferably in a range of 1.0 μm to 10 μm. Further, the film thickness of the raw film before being stretched and the film thickness of the stretched film used in the laminating are able to be set in consideration of the influence due to the stretching or the influence at the time of laminating the stretched film.

In the optical film having reverse wavelength dispersibility of this embodiment, two or more optical films are able to be laminated by using an adhesive material of which a refractive index difference ($\Delta n$) with respect to the optical film is less than or equal to 0.1.

Here, the refractive index difference between the adhesive material and the optical film to be laminated at a wavelength of 400 nm to 800 nm is generally less than or equal to 0.1, is preferably less than or equal to 0.08, and is more preferably less than or equal to 0.07. By setting the refractive index difference to be in this range, it is possible to maintain the degree of the degradation of light transmission due to interface reflection between the film and an adhesive layer to be low, and the total light transmittance to be high, and thus it is possible to prepare the phase difference film in which high transparency having total light transmittance of greater than or equal to 91% is maintained by the laminated film.

In addition, an adhesive material of the stretched film is not particularly limited, and as the adhesive material, a photocuring resin is preferably used. The photocuring resin at least has a composition containing one or more photocuring monomers and one or more photocuring initiators.

More preferably, the photocuring resin has a composition in which the fluorine-containing cyclic olefin polymer formed of at least one of the repeating structural unit substantially represented by General Formula (1) is mixed into this composition. The composition and the fluorine-containing cyclic olefin polymer are able to be mixed at an arbitrary ratio. Preferably, a mass ratio between the photocuring monomer and the fluorine-containing cyclic olefin polymer is 100/0 to 5/95, and is more preferably 95/5 to 30/70.

As the photocuring monomer, a resin containing a compound having a reactive double bond group and a ring-opening polymerizable compound which is able to perform cationic polymerization, and the like are included. These compounds may have one reactive group in one molecule, or may have a plurality of reactive groups in one molecule. In addition, as a photopolymerization initiator, a photoradical initiator generating a radical by light irradiation, a photocationic initiator generating a cation by light irradiation, and the like are included.

When the composition in which the photocuring monomer and the photocuring initiator are mixed is obtained, the used amount of the photocuring initiator is preferably greater than or equal to 0.05 parts by mass, and is more preferably 0.1 parts by mass to 10 parts by mass, with respect to 100 parts by mass of the photocuring monomer.

As the compound having the reactive double bond group which is the photocuring monomer, for example, cyclic olefins such as norbornene, and norbornadiene, alkyl vinyl ethers such as cyclohexyl methyl vinyl ether, isobutyl vinyl ether, cyclohexyl vinyl ether, and ethyl vinyl ether, vinyl esters such as vinyl acetate, (meth)acrylic acids such as (meth)acrylic acid, phenoxy ethyl acrylate, benzyl acrylate, stearyl acrylate, lauryl acrylate, 2-ethyl hexyl acrylate, allyl acrylate, 1,3-butanediol diacrylate, 1,4-butanediol diacrylate, 1,6-hexane diol diacrylate, trimethylol propane triacrylate, pentaerythritol triacrylate, dipentaerythritolhexaacrylate, ethoxy ethyl acrylate, methoxy ethyl acrylate, glycidyl acrylate, tetrahydrofurfuryl acrylate, diethylene glycol diacrylate, neopentyl glycol diacrylate, polyoxy ethylene glycol diacrylate, tripropylene glycol diacrylate, 2-hydroxy ethyl acrylate, 2-hydroxy propyl acrylate, 4-hydroxy butyl vinyl ether, N,N-diethyl aminoethyl acrylate, N,N-dimethyl aminoethyl acrylate, N-vinyl pyrrolidone, and dimethyl aminoethyl methacrylate, derivatives thereof, or fluorine-containing acrylates thereof, fluorodiene ($CF_2$=CFOCF$_2$CF$_2$CF=CF$_2$, $CF_2$=CFOCF$_2$CF(CF$_3$)CF=CF$_2$, $CF_2$=CFCF$_2$C(OH)(CF$_3$) $CH_2$CH=CH$_2$, $CF_2$=CFCF$_2$C(OH)(CF$_3$)CH=CH$_2$, $CF_2$=CFCF$_2$C(CF$_3$)(OCH$_2$OCH$_3$)CH$_2$CH=CH$_2$, $CF_2$=CFCH$_2$C(C(CF$_3$)$_2$OH)(CF$_3$)CH$_2$CH=CH$_2$, and the like), and the like are included. These compounds may be independently used, or two or more thereof may be used in combination.

In addition, as the photocuring monomer of the ring-opening polymerizable compound which is cationically polymerizable, for example, an alicyclic epoxy resin such as cyclohexene epoxide, dicyclopentadiene oxide, limonene dioxide, 4-vinyl cyclohexene dioxide, 3,4-epoxy cyclohexyl methyl-3',4'-epoxy cyclohexane carboxylate, di(3,4-epoxy cyclohexyl) adipate, (3,4-epoxy cyclohexyl)methyl alcohol, (3,4-epoxy-6-methyl cyclohexyl)methyl-3,4-epoxy-6-methyl cyclohexane carboxylate, ethylene 1,2-di(3,4-epoxy cyclohexane carboxylic acid) ester, (3,4-epoxy cyclohexyl) ethyl trimethoxy silane, phenyl glycidyl ether, dicyclohexyl-3,3'-diepoxide, a bisphenol A type epoxy resin, a halogenated bisphenol A type epoxy resin, a bisphenol F type epoxy resin, an o-, m-, or p-cresol novolac type epoxy resin, phenol novolac type epoxy resin, polyglycidyl ether of polyhydric alcohol, and 3,4-epoxy cyclohexenyl methyl-3',4'-epoxy cyclohexene carboxylate or epoxy compounds such as an epoxy compound of glycidyl ether of hydrogenation bisphenol A or the like, and 3-methyl-3-(butoxy methyl) oxetane, 3-methyl-3-(pentyloxy methyl) oxetane, 3-methyl-3-(hexyloxy methyl) oxetane, 3-methyl-3-(2-ethyl hexyloxy methyl) oxetane, 3-methyl-3-(octyloxy methyl) oxetane, 3-methyl-3-(Decanyloxymethyl) oxetane, 3-methyl-3-(Dodecanyloxy methyl) oxetane, 3-methyl-3-(phenoxy methyl) oxetane, 3-ethyl-3-(butoxy methyl) oxetane, 3-ethyl-3-(pentyloxy methyl) oxetane, 3-ethyl-3-(hexyloxy methyl) oxetane, 3-ethyl-3-(2-ethyl hexyloxy methyl) oxetane, 3-ethyl-3-(octyloxy methyl) oxetane, 3-ethyl-3-(Decanyloxy methyl) oxetane, 3-ethyl-3-(Dodecanyloxy methyl) oxetane, 3-(cyclohexyloxy methyl) oxetane, 3-methyl-3-(cyclohexyloxy methyl) oxetane, 3-ethyl-3-(cyclohexyloxy methyl) oxetane, 3-ethyl-3-(phenoxy methyl) oxetane, 3,3-dimethyl oxetane, 3-hydroxy methyl oxetane, 3-methyl-3-hydroxy methyl oxetane, 3-ethyl-3-hydroxy methyl oxetane, 3-ethyl-3-phenoxy methyl oxetane, 3-n-propyl-3-hydroxy methyl oxetane, 3-iso-propyl-3-hydroxy methyl oxetane, 3-n-butyl-3-hydroxy methyl oxetane, 3-iso-butyl-3-hydroxy methyl oxetane, 3-sec-butyl-3-hydroxy methyl oxetane, 3-tert-butyl-3-hydroxy methyl oxetane, 3-ethyl-3-(2-ethyl hexyl) oxetane, and the like are included, and as a compound having two or more oxetanyl groups, oxetane compounds such as bis(3-ethyl-3-oxetanyl methyl) ether, 1,2-bis(3-ethyl-3-oxetanyl methoxy) ethane, 1,3-bis(3-ethyl-3-oxetanyl methoxy) propane, 1,3-bis(3-ethyl-3-oxetanyl methoxy)-2,2-dimethyl-propane, 1,4-bis(3-ethyl-3-oxetanyl methoxy) butane, 1,6-bis(3-ethyl-3-oxetanyl methoxy) hexane, 1,4-bis[(3-methyl-3-oxetanyl)methoxy]benzene, 1,3-bis[(3-methyl-3-oxetanyl)methoxy]benzene, 1,4-bis{[(3-methyl-3-oxetanyl)methoxy]methyl}benzene, 1,4-bis{[(3-methyl-3-oxetanyl)methoxy]methyl}cyclohexane, 4,4'-bis{[(3-methyl-3-oxetanyl)methoxy]methyl}biphenyl, 4,4'-bis{[(3-methyl-3-oxetanyl)methoxy]methyl}bicyclohexane, 2,3-bis[(3-methyl-3-oxetanyl)methoxy]bicyclo[2.2.1]heptane, 2,5-bis[(3-methyl-3-oxetanyl)methoxy]bicyclo[2.2.1]heptane, 2,6-bis[(3-methyl-3-oxetanyl)methoxy]bicyclo[2.2.1]heptane, 1,4-bis[(3-ethyl-3-oxetanyl)methoxy]benzene, 1,3-bis[(3-ethyl-3-oxetanyl)methoxy]benzene, 1,4-bis{[(3-ethyl-3-oxetanyl)methoxy]methyl}benzene, 1,4-bis{[(3-ethyl-3-oxetanyl)methoxy]methyl}cyclohexane, 4,4'-bis{[(3-ethyl-3-oxetanyl)methoxy]methyl}biphenyl, 4,4'-bis{[(3-ethyl-3-oxetanyl)methoxy]methyl}bicyclohexane, 2,3-bis[(3-ethyl-3-oxetanyl)methoxy]bicyclo[2.2.1]heptane, 2,5-bis[(3-ethyl-3-oxetanyl)methoxy]bicyclo[2.2.1]heptane, and 2,6-bis[(3-ethyl-3-oxetanyl)methoxy]bicyclo[2.2.1]heptane are included. In addition, these compounds may be independently used, or two or more thereof may be used in combination.

In addition, as the photoradical initiator generating the radical by the light irradiation, for example, acetophenones such as acetophenone, p-tert-butyl trichloroacetophenone, chloroacetophenone, 2,2-diethoxy acetophenone, hydroxy acetophenone, 2,2-dimethoxy-2'-phenyl acetophenone, 2-aminoacetophenone, and dialkyl aminoacetophenone, benzoins such as benzoin, benzoin methyl ether, benzoin ethyl ether, benzoin-iso-propyl ether, benzoin-iso-butyl ether, 1-hydroxy cyclohexyl phenyl ketone, 2-hydroxy-2-methyl-1-phenyl-2-methyl propane-1-one, and 1-(4-iso-propyl phenyl)-2-hydroxy-2-methyl propane-1-one, benzophenones such as benzophenone, benzoyl benzoic acid, benzoyl benzoic acid methyl, methyl-o-benzoyl benzoate, 4-phenyl benzophenone, hydroxy benzophenone, hydroxy propyl benzophenone, acryl benzophenone, and 4,4'-bis(dimethyl amino)benzophenone, thioxanthones such as thioxanthone, 2-chlorothioxanthone, 2-methyl thioxanthone, diethyl thioxanthone, and dimethyl thioxanthone, fluorine-based peroxides such as perfluoro(tert-butyl peroxide), and perfluorobenzoyl peroxide, α-acyl oxime ester, benzyl-(o-ethoxy carbonyl)-α-monooxime, acyl phosphine oxide, glyoxy ester, 3-ketocoumarin, 2-ethyl anthraquinone, camphor quinone, tetramethyl thiuram sulfide, azobis-iso-butyronitrile, benzoyl peroxide, dialkyl peroxide, tert-butyl peroxy pivalate, and the like are included. In addition, these photoradical initiators may be independently used, or two or more thereof may be used in combination.

The photocationic initiator generating the cation by the light irradiation, according to the light irradiation is not particularly limited insofar as the photocationic initiator is a compound initiating the cationic polymerization of the ring-opening polymerizable compounds which are cationically polymerizable, and as the photocationic initiator, for example, a compound discharging a Lewis acid by a light reaction, such as an onium salt of an anion which is paired with an onium cation is preferable.

As a specific example of the onium cation, diphenyl iodonium, 4-methoxy diphenyl iodonium, bis(4-methyl phenyl) iodonium, bis(4-tert-butyl phenyl) iodonium, bis(dodecyl phenyl) iodonium, triphenyl sulfonium, diphenyl-4-thiophenoxy phenyl sulfonium, bis[4-(diphenyl sulfonio)-phenyl]sulfide, bis[4-(di(4-(2-hydroxy ethyl)phenyl) sulfonio)-phenyl]sulfide, η5-2,4-(cyclopentadienyl)[1,2,3,4,5,6-η-(methyl ethyl)benzene]-iron (1+), and the like are included. In addition, in addition to the onium cation, a perchlorate ion, a trifluoromethane sulfonic acid ion, a toluene sulfonic acid ion, a trinitrotoluene sulfonic acid ion, and the like are included.

On the other hand, as a specific example of the anion, tetrafluoroborate, hexafluorophosphate, hexafluoroantimonate, hexafluoroarsenate, hexachloroantimonate, tetra (fluorophenyl)borate, tetra(difluorophenyl)borate, tetra(trifluorophenyl)borate, tetra(tetrafluorophenyl)borate, tetra (pentafluorophenyl)borate, tetra(perfluorophenyl)borate, tetra(trifluoromethyl phenyl)borate, tetra(di(trifluoromethyl)phenyl)borate, and the like are included. In addition, these photocationic initiators may be independently used, or two or more thereof may be used in combination.

Further, preferably, in order to prepare an adhesive material of which a refractive index difference ($\Delta n$) with respect to the optical film is less than or equal to 0.1, in the optical film in which two or more of the optical films of this embodiment are laminated, it is possible to mix the fluorine-containing cyclic olefin polymer formed of at least one of the repeating structural unit substantially represented by General Formula (1) into a mixture formed of one or more photocuring monomers and one or more photocuring initiators. Further, as other known components, a modifier such as an anti-aging agent, a leveling agent, a wettability improving agent, a surfactant agent, and a plasticizer, a stabilizer such as a ultraviolet absorbing agent, an antiseptic agent, and an antifungal agent, a photosensitizer, a silane coupling agent, a solvent, and the like are able to be mixed.

Further, the optical film having reverse wavelength dispersibility of this embodiment is able to be prepared by laminating two or more optical films to each other through the adhesive agent which is the photocuring resin. The adhesive agent formed of the photocuring resin is used by performing fine filtration using the method described in Step b of preparing the optical film of this embodiment, and thus it is possible to obtain the optical film having reverse wavelength dispersibility in which foreign substances are prevented from being mixed into the adhesive layer at the time of the laminating, excellent film thickness accuracy, suppressed phase difference unevenness, and suppressed occurrence of the defect such as a fish eye. The hole diameter of a filter used at this time is generally less than or equal to 0.5 μm, is preferably less than or equal to 0.1 μm, is more preferably less than or equal to 0.05 μm, and is even more preferably less than or equal to 0.02 μm, and a filter having a hole diameter which is identical to or less than or equal to the filter hole diameter in the final stage used in the fine filtration step at the time of preparing the polymer varnish is selected. In addition, a method of applying the photocuring resin onto the film as the adhesive agent is not particularly limited, and as the method, for example, a method is included in which the photocuring resin is applied onto the film by using a method such as table coating, spin coating, die coating, spray coating, bar coating, roll coating, and curtain flow coating. After the adhesive material is applied onto the optical film, the other optical film is placed, and thus the optical films are able to be laminated by being irradiated with light such as ultraviolet light. Further, in order to make the film thickness of the laminated film even or to improve productivity, the film and the photocuring resin may be crimped by using a known method such as an extrusion laminating method, and a dry laminating method. The film thickness of the laminated film can be controlled by optimizing a crimping stress, a temperature, and a distance between rollers in consideration of the viscosity of the photocuring resin, the tension of the film surface, the elasticity of the film, and the like. At this time, the UV irradiation method may be either a method in which the UV irradiation is performed while the crimping is performed or a method in which the crimping is performed and then the UV irradiation is performed.

The irradiation light is not particularly limited insofar as energy which causes a radical reaction or an ion reaction is able to be exerted by performing the light irradiation with respect to the photocuring initiator. As this light source, a light ray having a wavelength of less than or equal to 400 nm, for example, a low-pressure mercury lamp, a medium-pressure mercury lamp, a high-pressure mercury lamp, a ultrahigh-pressure mercury lamp, a chemical lamp, a black light lamp, a microwave excitation mercury lamp, and a metal halide lamp, an i ray, a G ray, KrF excimer laser light, and ArF excimer laser light are able to be used.

The irradiation strength to the photocuring resin is controlled according to each target product, but is not particularly limited. For example, it is preferable that the light irradiation strength of a light wavelength region (light of generally 300 nm to 420 nm is used, but is different according to the photopolymerization initiator) which is effective for activating the photopolymerization initiator described below is 0.1 mW/cm$^2$ to 100 mW/cm$^2$. When the irradiation strength to the composition is less than 0.1 mW/cm$^2$, a reaction time excessively increases, and when the irradiation strength to the composition is greater than 100 mW/cm$^2$, according to heat emitted from a lamp and heat generated at the time of polymerizing the composition, an aggregation force of a cured material to be obtained may decrease, and yellowing or degradation of a support body may occur.

The light irradiation time is controlled according to each target product, but is not particularly limited, and cumulative light intensity represented as the product of the light irradiation strength and the light irradiation time in the light wavelength region is able to be set to 3 mJ/cm$^2$ to 1000 mJ/cm². The cumulative light intensity is more preferably 5 mJ/cm² to 500 mJ/cm², and is particularly preferably 10 mJ/cm² to 300 mJ/cm². When the cumulative light intensity to the composition is less than 3 mJ/cm², activated species are not sufficiently generated from the photopolymerization initiator, and the properties of the cured material to be obtained may decrease, and when the cumulative light intensity to the composition is greater than 1000 mJ/cm², it is not advantageous for improving productivity. In addition, heating for accelerating the polymerization reaction is also preferable according to the case. In addition, the temperature at the time of curing the curing resin by light irradiation is preferably 0° C. to 100° C., is more preferably 0° C. to 60° C., and is preferably selected from temperatures which are lower than the softening temperature of the phase difference film formed of the fluorine-containing cyclic olefin polymer.

The thickness of the adhesive layer in which the curing material is cured by the light irradiation is not particularly limited, and is preferably 0.5 µm to 100 µm, is more preferably 0.5 µm to 50 µm, and is most preferably 0.5 µm to 10 µm. When the thickness is greater than 100 µm, wrinkling may be generated on the film according to the curing contraction at the time of the UV irradiation or phase difference properties may be changed, and when the thickness is less than 0.5 µm, contact unevenness may occur on the interface between the photocuring resin and the film surface due to a problem of film thickness homogeneity of the film or the like, and adhesive strength after the curing may not be obtained.

Such a phase difference film having high transparency, small wavelength dispersibility of the phase difference, or reverse wavelength dispersibility is able to be used as a member for display materials such as a liquid crystal display, a reflective liquid crystal display, an organic EL display, an inner touch panel, and a liquid crystal projector, and for example, when the phase difference film is used as a liquid crystal display member, it is possible to improve the contrast of the image display by correcting black display. In addition, the film having a specific phase difference of specifically 140 nm and 280 nm as each of the λ/4 wavelength plate and the λ/2 wavelength plate is used in various image display materials as a polarization element converting linear polarization into circular polarization and circular polarization into linear polarization, and for example, the λ/4 wavelength plate having reverse wavelength dispersion of this embodiment is used as a reflective liquid crystal display member, and thus the number of phase difference films to be laminated is able to be reduced, and the image display having excellent viewing angle properties is able to be performed.

EXAMPLES

Hereinafter, in examples, the present invention will be described, but the present invention is not limited to the following examples. Furthermore, in the examples, an analysis value measuring method of the synthesized polymer, the stretching method of the film, and the measuring method of the phase difference will be described below, values of the physical properties of the film having low wavelength dispersibility are shown in Table-1, and the values of the physical properties of the optical film in which the films having low wavelength dispersibility are laminated are shown in Table-2.

[Weight Average Molecular Weight (Mw), and Molecular Weight Distribution (Mw/Mn)]

The weight average molecular weight (Mw) and the number average molecular weight (Mn) of the polymer which was dissolved in tetrahydrofurane (THF) were measured by calibrating the molecular weight according to a polystyrene standard using a gel permeation chromatography (GPC) in the following conditions.

Detector: RI-2031 and 875-UV manufactured by Jasco Corporation

Serially Connected Column: Shodex K-806M, 804, 803, 802.5

Column Temperature: 40° C.
Flow Rate: 1.0 ml/minute
Sample Concentration: 3.0 mg/ml

[Hydrogenation Ratio of Cyclic Olefin Polymer]

A powder of the ring-opening metathesis polymer which was subjected to the hydrogenation reaction was dissolved in deuterated chloroform or deuterated tetrahydrofurane, a 270 MHz-$^1$H-NMR spectrum was measured by using a nuclear magnetic resonance device manufactured by Jeol Ltd., and the hydrogenation ratio was calculated by the value of integral of a signal derived from hydrogen which was bonded to double bond carbon of the main chain of $\delta$=4.5 ppm to 7.0 ppm.

[Composition (Molar) Ratio of Cyclic Olefin Copolymer]

The cyclic olefin copolymer in which the ring-opening metathesis polymer was hydrogenated was dissolved in deuterated tetrahydrofurane, and was measured by using the following method, and thus the composition was calculated.

Orthodifluorobenzene was added as a reference substance, a 373 MHz-$^{19}$F-NMR spectrum was measured by using an ECX400 type nuclear magnetic resonance device manufactured by Jeol Ltd., and the composition was calculated by the value of an integral of fluorine derived from —CF of $\delta$=−150 ppm to −200 ppm, —CF$_2$ of $\delta$=−100 ppm to −150 ppm, or —CF$_3$ of $\delta$=−60 ppm to −100 ppm using orthodifluorobenzene of $\delta$=−139 ppm as a reference signal.

[Glass Transition Temperature]

A measurement sample was heated at a temperature increase rate of 10° C./minute in a nitrogen atmosphere, and was measured by using DSC-50 manufactured by Shimadzu Corporation.

[Stretching Method of Film]

The film was heated to a predetermined temperature in chucks having a distance between the chucks of 70 mm×a width of 70 mm, and then was monoaxially stretched at a velocity of 30 mm/min and a predetermined magnification by using a stretching device IMC-19FC manufactured by Imoto Machinery Co., Ltd. In addition, the width of 70 mm of the film was fixed as a first stretching axis by the chuck having a width of 70 mm, the width of 30 mm of the film was fixed as a second stretching axis by the chuck having a width of 30 mm, and the film was heated to a predetermined temperature, and then was simultaneously biaxially stretched at a velocity of 30 mm/min and a predetermined magnification of each of the first stretching axis and the second stretching axis.

[Measurement of Phase Difference]

The phase difference was measured by using a retardation measurement device RETS-100 manufactured by Otsuka Electronics Co., Ltd. and by using a rotation analyzer method in which a halogen lamp was used as a light source and a multichannel spectrophotometer was used as a detector. The phase difference of the wavelength of 400 nm to 800 nm was obtained by calculating the average value of the wavelength of 400 nm, 550 nm, and 800 nm from data measured at 16 points (4 lines, and 4 rows) in a range of 50 mm×50 mm while moving a sample stage using numerical analysis, and the standard deviation was calculated using the numerical analysis and was set to the phase difference unevenness by applying a sign (±) to the standard deviation. Here, the phase difference unevenness was represented by the standard deviation value of a wavelength of 550 nm per unit area. That is, a relationship of Phase Difference Unevenness=±Standard Deviation Value of Wavelength of 550 nm 25 cm$^2$ is satisfied, and the unit is nm/cm$^2$. The phase differences are shown in Table-1 and Table-2.

[Checking of Slow Axis of Stretched Film]

A relationship between the stretching axis and the slow axis of the stretched film at the time of laminating the film was checked by using a sample centering function of a retardation measurement device RETS-100 manufactured by Otsuka Electronics Co., Ltd., and the films in which the angle of the slow axis with respect to the stretching axis is in a range of 0° (parallel) to 1° in the relationship between the stretching axis and the slow axis were laminated on the basis of the stretching axis.

[Measurement of Refractive Index]

The refractive index of the film which was cut to have a size of 10 mm×20 mm at a wavelength of 589 nm (a D ray) was measured by using a multiwavelength Abbe's refractometer manufactured by Atago Co., Ltd. In addition, the refractive index of the composition in which the photocuring monomer and the photocuring initiator were mixed was also similarly measured.

[Measurement of Total Light Transmittance and Turbidness (Haze)]

The total light transmittance and the turbidness were measured on the basis of JIS K 7361 "Test Method of Total Light Transmittance of Transparent Plastic Material" by using a hazemeter NDH4000 manufactured by Nippon Denshoku Industries Co., Ltd. As the measurement result, the total light transmittance may be obtained by rounding off the first decimal point from a viewpoint of measurement accuracy.

[Measurement of Reflectance]

Regular reflection at an incident angle of 5° was measured in a range of a wavelength of 200 nm to 800 nm by using a U-4100 type spectrophotometer manufactured by Hitachi, Ltd., and the reflectance at a wavelength of 550 nm was checked from the measurement result.

[Adhesiveness Test of Film]

One surface of the laminated film was cut into a grid having 100 pieces of grid squares each having a size of 2 mm×2 mm on the basis of JIS K 5600 5-6 "Cross Cut Method", and a cellophane tape manufactured by Nichiban Co., Ltd. was attached to and detached from the cut films, and then the number of remaining films was counted and evaluated.

[Manufacturing Example 1] Polymer 1

A tetrahydrofurane solution of Mo(N-2,6-Pr$^i{}_2$C$_6$H$_3$)(CHCMe$_2$Ph)(OBu$^t$)$_2$ (50 mg) was added to a tetrahydrofurane solution of 5,5,6-trifluoro-6-(trifluoromethyl)bicyclo[2.2.1]hept-2-en (100 g) and 1-hexene (0.268 g), and the ring-opening metathesis polymerization was performed at 70° C. The olefin part of the obtained polymer was subjected to the hydrogenation reaction at 160° C. by using palladium alumina (5 g), and thus a tetrahydrofurane solution of poly(1,1,2-trifluoro-2-trifluoromethyl-3,5-cyclopentylene ethylene) was obtained. The solution was subjected to pressure filtration using a filter having a hole diameter of 5 µm, the solution from which the palladium alumina was removed was added to methanol, and a white polymer was filtered and dried, and thus 99 g of Polymer 1 was obtained. The hydrogenation ratio was 100%, the weight average molecular weight (Mw) was 83000, the molecular weight distribution (Mw/Mn) was 1.73, and the glass transition temperature was 109° C.

[Manufacturing Example 2] Polymer 2

Polymer 2 of poly[1,2-difluoro-1,2-bis(trifluoromethyl)-3,5-cyclopentylene ethylene] (49 g) was obtained by the same method as that in Manufacturing Example 1 except that the monomer was changed to 5,6-difluoro-5,6-bis(trifluoromethyl)-bicyclo[2.2.1]hept-2-en (50 g). The hydrogenation ratio was 100%, the weight average molecular weight (Mw) was 95000, the molecular weight distribution (Mw/Mn) was 1.52, and the glass transition temperature was 125° C.

[Manufacturing Example 3] Polymer 3

A trifluoromethyl benzene solution of Mo(N-2,6-Pr$^i{}_2$C$_6$H$_3$)(CHCMe$_2$Ph)(OBu$^t$)$_2$ (15 mg) was added to a trifluoromethyl benzene solution of 5,6-difluoro-5-heptafluoro-iso-propyl-6-trifluoromethyl bicyclo[2.2.1]hept-2-en (50 g) and 1-hexene (0.034 g), and the ring-opening metathesis polymerization was performed at 70° C. The solvent of the obtained polymer solution was substituted with THF, the olefin part was subjected to the hydrogenation reaction at 160° C. by using palladium alumina (2.5 g), and thus a THF solution of poly(1,2-difluoro-1-heptafluoro-iso-propyl-2-trifluoromethyl-3,5-cyclopentylene ethylene) was obtained. The solution was subjected to the pressure filtration using a filter having a hole diameter of 5 µm, the solution from which the palladium alumina was removed was added to methanol, a white polymer was filtered and dried, and thus 49 g of Polymer 3 was obtained. The hydrogenation ratio was 100%, the weight average molecular weight (Mw) was 142000, the molecular weight distribution (Mw/Mn) was 1.40, and the glass transition temperature was 137° C.

[Manufacturing Example 4] Polymer 4

Polymer 4 of a copolymer of poly(1,2-difluoro-1-heptafluoro-iso-propyl-2-trifluoromethyl-3,5-cyclopentylene ethylene) and poly(1,2-difluoro-1,2-bistrifluoromethyl-4-oxa-3,5-cyclopentylene ethylene) (63 g) was obtained by the same method as that in Manufacturing Example 3 except that the monomer was changed to 5,6-difluoro-5-heptafluoro-iso-propyl-6-trifluoromethyl bicyclo[2.2.1]hept-2-en (37 g) and 5,6-difluoro-5,6-bistrifluoromethyl-7-oxa-bicyclo[2.2.1]hept-2-en (27 g), and the ring-opening metathesis polymerization catalyst was changed to Mo(N-2,6-Pr$^i{}_2$C$_6$H$_3$)(CHCMe$_2$Ph)(OCMe(CF$_3$)$_2$)$_2$ (38 mg). The hydrogenation ratio was 100%, the composition ratio was 50/50, the weight average molecular weight (Mw) was 138000, the molecular weight distribution (Mw/Mn) was 1.55, and the glass transition temperature was 101° C.

[Manufacturing Example 5] Polymer 5

A tetrahydrofurane solution of poly(1,1,2-trifluoro-2-trifluoromethyl-3,5-cyclopentylene ethylene) was obtained by the same method as that in Manufacturing Example 1. The solution was subjected to the pressure filtration using a filter having a hole diameter of 5 µm, and then the solution from which the palladium alumina was removed was subjected to the pressure filtration using a filter having a hole diameter of 1 µm and further passed through the filter having a hole diameter of 0.1 µm two times, and finally, was subjected to multi-stage pressure filtration using a filter having a hole diameter of 0.05 μm. After that, the THF solution of the polymer was condensed by using a vacuum pump while being heated at 40° C., and then methyl isobutyl ketone was added thereto as a solvent, and was condensed and dried by using the vacuum pump while being heated at 80° C., and thus 98 g of Polymer 5 was obtained. Further, Polymer 5 which was obtained was dissolved again in methyl isobutyl ketone at a concentration of 30 mass %, and thus a methyl isobutyl ketone solution of Polymer 5 was prepared.

[Manufacturing Example 6] Polymer 6

A cyclohexane solution of a copolymer of poly(1-methyl-cyclopentylene ethylene) and poly(3-methyl-tricyclo[4.3.0.1$^{2,5}$]decanylene ethylene) was obtained by the same method as that in Manufacturing Example 4 except that two types of monomers described in Manufacturing Example 4 were changed to 5-methyl-bicyclo[2.2.1]hept-2-en (20.0 g) and 8-methyl-tetracyclo[4.4.0.1$^{2,5}$.1$^{7,10}$]-3-dodecene (32.2 g), and the solvent was changed to cyclohexane. The solution was subjected to the pressure filtration using a filter having a hole diameter of 5 μm, the solution was added to methanol, a white polymer was filtered and dried, and thus 51 g of Polymer 6 was obtained. The hydrogenation ratio was 100%, the composition ratio [A]/[B] was 50/50, the weight average molecular weight (Mw) was 82000, the molecular weight distribution (Mw/Mn) was 2.26, and the glass transition temperature was 104° C.

[Manufacturing Example 7] Polymer 7

A tetrahydrofurane solution of a copolymer of poly(1,1,2-trifluoro-2-trifluoromethyl-3,5-cyclopentylene ethylene) and poly(3,3,4-trifluoro-4-trifluoromethyl-7,9-tricyclo[4.3.0.1$^{2,5}$]decanylene ethylene) was obtained by the same method as that in Manufacturing Example 1 except that the two types of monomers were changed to 5,5,6-trifluoro-6-trifluoromethyl-bicyclo[2.2.1]hept-2-en (7.8 g) and 8,8,9-trifluoro-9-trifluoromethyl-tetracyclo[4.4.0.1$^{2,5}$.1$^{7,10}$]-3-dodecene (34.5 g). The solution was added to methanol, and a white polymer was filtered and dried, and thus 41 g of Polymer 7 was obtained. The hydrogenation ratio was 100%, the composition ratio [A]/[B] was 30/70, the weight average molecular weight (Mw) was 75000, the molecular weight distribution (Mw/Mn) was 3.06, and the glass transition temperature was 169° C.

[Manufacturing Example 8] Polymer 8

A tetrahydrofurane solution of Mo(N-2,6-Pr$^i_2$C$_6$H$_3$)(CHCMe$_2$Ph)(OBu$^t$)$_2$ (84 mg) was added to a tetrahydrofurane solution of 5,5,6-trifluoro-6-(trifluoromethyl)bicyclo[2.2.1]hept-2-en (10 g), and living ring-opening metathesis polymerization was performed at 70° C. without putting a chain transfer agent thereto. The olefin part of the obtained polymer was subjected to the hydrogenation reaction at 160° C. by using palladium alumina (5 g), and thus a tetrahydrofurane solution of poly(1,1,2-trifluoro-2-trifluoromethyl-3,5-cyclopentylene ethylene) was obtained. The solution was subjected to the pressure filtration using a filter having a hole diameter of 5 μm, the obtained solution was added to methanol, a pale yellow polymer was filtered and dried, and thus 9 g of Polymer 8 was obtained. The hydrogenation ratio was 100%, the weight average molecular weight (Mw) was 65000, the molecular weight distribution (Mw/Mn) was 1.03, and the glass transition temperature was 110° C.

Example 1

Polymer 1 synthesized in Manufacturing Example 1 was dissolved in methyl ethyl ketone at a concentration of 30 mass %, the solution was subjected to pressure filtration using a filter having a hole diameter of 1 μm, and then, a methyl ethyl ketone solution which was subjected to multi-stage pressure filtration using a filter having a hole diameter of 0.1 μm and a filter having a hole diameter of 0.05 μm was applied onto a glass substrate, was evenly applied by using an applicator, and then was dried at 100° C. for 30 minutes and was peeled off, and thus a film having a flat and smooth surface of which the thickness was 65 μm was obtained. After that, the film was fixed in chucks having a distance between the chucks of 70 mm and a width of 70 mm, and was stretched at a stretching temperature of 120° C. and a stretching magnification of 1.7 times, and thus a film having a thickness of 36 μm was obtained. The phase difference of the film was 146.97±1.59 nm (λ=400 nm), 144.09±1.51 nm (λ=550 nm), and 143.71±1.54 nm (λ=800 nm), Re (400 nm)/Re (550 nm) was 1.02, and Re (400 nm)/Re (800 nm) was 1.02. In addition, the total light transmittance is 94.5%, a D ray refractive index is 1.408, the haze is 0.3%, the reflectance is 5.5%, the angle of the slow axis with respect to the stretching axis is 0.2°, and the film is a λ/4 wavelength plate. The results are shown in Table-1.

Example 2

A film having a flat and smooth surface of which the thickness was 65 μm was obtained by the same method as that in Example 1. After that, the film was fixed in chucks having a distance between the chucks of 70 mm and a width of 70 mm, and was stretched by changing the stretching temperature to 115° C. and the stretching magnification to 2.3 times, and thus a film having a thickness of 24 μm was obtained. The phase difference of the film was 288.42±1.75 nm (λ=400 nm), 279.00±1.70 nm (λ=550 nm), and 278.74±1.72 nm (λ=800 nm), Re (400 nm)/Re (550 nm) was 1.03, and Re (400 nm)/Re (800 nm) was 1.03. In addition, the total light transmittance is 94.5%, the D ray refractive index is 1.408, the haze is 0.3%, the reflectance is 5.5%, the angle of the slow axis with respect to the stretching axis is 0.1°, and the film is a λ/2 wavelength plate. The results are shown in Table-1.

Example 3

Polymer 2 synthesized in Manufacturing Example 2 was dissolved in methyl ethyl ketone at a concentration of 30 mass %, the solution was subjected to pressure filtration using a filter having a hole diameter of 1 μm, and then passed through a filter having a hole diameter of 0.1 μm two times, and was subjected to the multi-stage pressure filtration using a filter having a hole diameter of 0.05 μm, and thus a film having a flat and smooth surface of which the thickness was 67 μm was obtained using the solution by the same method as that in Example 1. After that, the film was fixed in chucks having a distance between the chucks of 70 mm and a width of 70 mm, and was stretched at a stretching temperature of 135° C. and a stretching magnification of 1.7 times, and thus a film having a thickness of 36 μm was obtained. The phase difference of the film was 144.11±1.40 nm (λ=400 nm), 141.83±1.49 nm (λ=550 nm), and 140.95±1.43 nm (λ=800 nm), Re (400 nm)/Re (550 nm) was 1.02, and Re (400 nm)/Re (800 nm) was 1.02. In addition, the total light transmittance is 94.9%, the D ray refractive index is 1.391, the haze is 0.3%, the reflectance is 5.1%, the angle of the slow axis with respect to the stretching axis is 0.3°, and the film is a λ/4 wavelength plate. The results are shown in Table-1.

Example 4

Polymer 3 synthesized in Manufacturing Example 3 was dissolved in trifluoromethyl benzene at a concentration of 30 mass %, the solution was subjected to pressure filtration using a filter having a hole diameter of 1 μm, and then, passed through a filter having a hole diameter of 0.1 μm two times, and was subjected to the multi-stage pressure filtration using a filter having a hole diameter of 0.05 μm, and the trichloromethyl benzene solution was applied onto a glass substrate, and was evenly applied by using an applicator, and then was dried at 120° C. for 30 minutes and was peeled off, and thus a film having a flat and smooth surface of which the thickness was 71.0 μm was obtained. After that, the film was fixed in chucks having a distance between the chucks of 70 mm and a width of 70 mm, and was stretched at a stretching temperature of 155° C. and a stretching magnification of 1.6 times, and thus a film having a thickness of 40 μm was obtained. The phase difference of the film was 144.21±1.53 nm (λ=400 nm), 141.05±1.50 nm (λ=550 nm), and 141.01±1.51 nm (λ=800 nm), Re (400 nm)/Re (550 nm) was 1.02, and Re (400 nm)/Re (800 nm) was 1.02. In addition, the total light transmittance is 95.2%, the D ray refractive index is 1.38, the haze is 0.3%, the reflectance is 4.8%, the angle of the slow axis with respect to the stretching axis is 0.2°, and the film is a λ/4 wavelength plate. The results are shown in Table-1.

Example 5

Polymer 4 synthesized in Manufacturing Example 4 was dissolved in methyl isobutyl ketone at a concentration of 30 mass %, the solution was subjected to pressure filtration using a filter having a hole diameter of 1 μm, and then was subjected to the multi-stage pressure filtration using a filter having a hole diameter of 0.1 μm, and the solution was applied onto a glass substrate, was evenly applied by using an applicator, and then was dried at 120° C. for 30 minutes and was peeled off, and thus a film having a flat and smooth surface of which the thickness was 63 μm was obtained. After that, the film was fixed in chucks having a distance between the chucks of 70 mm and a width of 70 mm, and was stretched at a stretching temperature of 111° C. and a stretching magnification of 1.8 times, and thus a film having a thickness of 32 μm was obtained. The phase difference of the film was 144.62±1.22 nm (λ=400 nm), 140.67±1.27 nm (A=550 nm), and 140.53±1.23 nm (λ=800 nm), Re (400 nm)/Re (550 nm) was 1.03, and Re (400 nm)/Re (800 nm) was 1.03. In addition, the total light transmittance is 95.1%, the D ray refractive index is 1.39, the haze is 0.3%, the reflectance is 6.5%, the angle of the slow axis with respect to the stretching axis is 0.1°, and the film is a λ/4 wavelength plate. The results are shown in Table-1.

Example 6

The methyl isobutyl ketone solution of Polymer 5 which was prepared in Manufacturing Example 5 was applied onto a glass substrate, was evenly applied by using an applicator, and then was dried at 120° C. for 30 minutes and was peeled off, and thus a film having a flat and smooth surface of which the thickness was 64 μm was obtained. After that, the film was fixed in chucks having a distance between the chucks of 70 mm and a width of 70 mm, and was stretched at a stretching temperature of 120° C. and a stretching magnification of 1.7 times, and thus a film having a thickness of 35 μm was obtained. The phase difference of the film was 145.87±1.51 nm (λ=400 nm), 143.01±1.53 nm (λ=550 nm), and 142.59±1.50 nm (λ=800 nm), Re (400 nm)/Re (550 nm) was 1.02, and Re (400 nm)/Re (800 nm) was 1.02. In addition, the total light transmittance is 94.5%, the D ray refractive index is 1.408, the haze is 0.3%, the reflectance is 5.5%, the angle of the slow axis with respect to the stretching axis is 0.1°, and the film is a λ/4 wavelength plate. The results are shown in Table-1.

Example 7

A λ/4 wavelength plate having a thickness of 36 μm in which the phase differences of each of two films prepared from Polymer 1 by the same method as that in Example 1 was 146.97±1.43 nm (λ=400 nm), 144.09±1.42 nm (λ=550 nm), 143.71±1.45 nm (λ=800 nm), Re (400 nm)/Re (550 nm) was 1.02, and Re (400 nm)/Re (800 nm) was 1.02, the total light transmittance was 94.5%, the D ray refractive index was 1.408, the haze was 0.3%, the reflectance was 5.5%, and the angle of the slow axis with respect to the stretching axis was 0.2° and a λ/4 wavelength plate having a thickness of 36 μm in which the phase difference was 145.49±1.39 nm (λ=400 nm), 143.06±1.40 nm (λ=550 nm), and 142.32±1.41 nm (λ=800 nm), Re (400 nm)/Re (550 nm) was 1.02, Re (400 nm)/Re (800 nm) was 1.02, the total light transmittance was 94.5%, the D ray refractive index was 1.408, the haze was 0.3%, the reflectance was 5.5%, and the angle of the slow axis with respect to the stretching axis was 0.1° were superposed at an angle of 60° in which the stretching axes of the films intersected each other by using a solution in which 1.0 wt % of a photopolymerization initiator Adekaoptomer SP-172 (manufactured by Adeka Corporation) was added to a composition including 3-ethyl-3[{(3-ethyl oxetane-3-yl) methoxy}methyl]oxetane and 1,7-octadiene-di-epoxide at a mass ratio of 90/10 (a D ray refractive index=1.449) as Adhesive Agent 1 (a refractive index difference of 0.041) and were subjected to the UV irradiation, and thus a film was prepared in which the two phase difference films were laminated. The phase difference of the film was 129.91±1.30 nm (λ=400 nm), 141.12±1.38 nm (λ=550 nm), and 146.76±1.32 nm (λ=800 nm), Re (400 nm)/Re (550 nm) was 0.92, and the Re (400 nm)/Re (800 nm) was 0.89. In addition, the total light transmittance was 92.1%, the haze was 0.6%, the reflectance was 7.9%, and the film was a λ/4 wavelength plate having a thickness of 75 μm. Further, in a peeling test using a cross cut method, all 100 pieces of the film had excellent adhesiveness without being peeled off. The results are shown in Table-2.

Example 8

A λ/4 wavelength plate having a thickness of 36 μm in which the phase difference of a film prepared from Polymer 2 of Example 3 was 144.11±1.11 nm (λ=400 nm), 141.83±1.15 nm (λ=550 nm), and 140.95±1.13 nm (λ=800 nm), Re (400 nm)/Re (550 nm) was 1.02, Re (400 nm)/Re (800 nm) was 1.02, the total light transmittance was 94.9%, the D ray refractive index was 1.391, the haze was 0.3%, the reflectance was 5.1%, and the angle of the slow axis with respect to the stretching axis was 0.3° and a λ/4 wavelength plate having a thickness of 36 μm in which the phase difference of a film prepared from Polymer 1 by the same method as that in Example 1 was 146.21±1.32 nm (λ=400 nm), 143.31±1.35 nm (λ=550 nm), and 142.89±1.37 nm (λ=800 nm), Re (400 nm)/Re (550 nm) was 1.02, Re (400 nm)/Re (800 nm) was 1.02, the total light transmittance was 94.5%, the D ray refractive index was 1.408, the haze was 0.3%, the reflectance was 5.5%, and the angle of the slow axis with respect to the stretching axis was 0.1° were superposed at an angle of 60° in which the stretching axes of the films intersected each other by using a solution in which Polymer 1 is dissolved in Adhesive Agent 1 of Example 7, that is, 1.0 wt % of a photopolymerization initiator Adekaoptomer SP-172 (manufactured by Adeka Corporation) is added to a composition including 3-ethyl-3 [{(3-ethyl oxetane-3-yl) methoxy}methyl]oxetane, 1,7-octadiene-di-epoxide, and poly(1,1,2-trifluoro-2-trifluoromethyl-3,5-cyclopentylene ethylene) at a mass ratio of 70/15/15 (a D ray refractive index of 1.44) was set as Adhesive Agent 2 (a refractive index difference of 0.032) and were subjected to the UV irradiation, and thus a film was prepared in which the two phase difference films were laminated. The phase difference of the film was 129.41±1.22 nm (λ=400 nm), 142.21±1.29 nm (λ=550 nm), and 146.99±1.25 nm (λ=800 nm), the Re (400 nm)/Re (550 nm) was 0.91, and Re (400 nm)/Re (800 nm) was 0.88. In addition, the total light transmittance was 93.7%, the haze was 0.6%, the reflectance was 6.3%, and the film was a λ/4 wavelength plate having a thickness of 75 μm. Further, in a peeling test using a cross cut method, all 100 pieces of the film had excellent adhesiveness without being peeled off. The results are shown in Table-2.

Example 9

A λ/2 wavelength plate having a thickness of 24 μm in which the phase difference of each of two films prepared from Polymer 1 by the same method as that in Example 2 was 288.42±1.82 nm (λ=400 nm), 279.00±1.84 nm (λ=550 nm), and 276.21±1.81 nm (λ=800 nm), Re (400 nm)/Re (550 nm) was 1.03, Re (400 nm)/Re (800 nm) was 1.04, the total light transmittance was 94.5%, the D ray refractive index was 1.408, the haze was 0.3%, the reflectance was 5.5%, and the angle of the slow axis with respect to the stretching axis was 0.1° and a λ/2 wavelength plate having a thickness of 24 μm in which the phase difference was 288.31±1.79 nm (λ=400 nm), 280.03±1.80 nm (λ=550 nm), and 279.23±1.77 nm (λ=800 nm), Re (400 nm)/Re (550 nm) was 1.03, Re (400 nm)/Re (800 nm) was 1.03, the total light transmittance was 94.5%, the haze was 0.3%, the reflectance was 5.5%, the D ray refractive index was 1.408, and the angle of the slow axis with respect to the stretching axis was 0.1° were superposed at an angle of 40° in which the stretching axes of the films intersected each other and were adhered to each other through Adhesive Agent 1 by the same method as that in Example 7, and thus a film was prepared in which the two films were laminated. The phase difference of the film was 226.77±1.77 nm (λ=400 nm), 279.96±1.79 nm (λ=550 nm), and 293.96±1.78 nm (λ=800 nm), Re (400 nm)/Re (550 nm) was 0.81, and Re (400 nm)/Re (800 nm) was 0.77. In addition, the total light transmittance was 93.5%, the haze was 0.6%, the reflectance was 6.5%, and the film was a λ/2 wavelength plate having a thickness of 50 μm. Further, in a peeling test using a cross cut method, all 100 pieces of the film had excellent adhesiveness without being peeled off. The results are shown in Table-2.

Example 10

Three stretched films in which the total light transmittance was 94.5%, the D ray refractive index was 1.408, the haze was 0.3%, and the reflectance was 5.5% were prepared from Polymer 1 by the same method as that in Example 1. Film (I) was a λ/4 wavelength plate having a thickness of 36 μm in which the phase difference was 144.80±1.54 nm (λ=400 nm), 141.94±1.51 nm (λ=550 nm), and 141.58±1.53 nm (λ=800 nm), Re (400 nm)/Re (550 nm) was 1.02, Re (400 nm)/Re (800 nm) was 1.02, and the angle of the slow axis with respect to the stretching axis was 0.1°, Film (II) was a λ/4 wavelength plate having a thickness of 36 μm in which the phase difference was 141.22±1.49 nm (λ=400 nm), 138.31±1.45 nm (λ=550 nm), and 137.95±1.47 nm (λ=800 nm), Re (400 nm)/Re (550 nm) was 1.02, Re (400 nm)/Re (800 nm) was 1.02, and the angle of the slow axis with respect to the stretching axis was 0.2°, and Film (III) was a λ/4 wavelength plate having a thickness of 36 μm in which the phase difference was 145.12 nm±1.49 (λ=400 nm), 142.36±1.45 nm (λ=550 nm), and 141.69±1.43 nm (λ=800 nm), Re (400 nm)/Re (550 nm) was 1.02, Re (400 nm)/Re (800 nm) was 1.02, and the angle of the slow axis with respect to the stretching axis was 0.1°.

Next, Film (I) and Film (II) were superposed at an angle of 80° in which the stretching axes of the films intersected each other, and Film (II) and Film (III) were superposed at an angle of 10° in which the stretching axes of the films intersected each other through Adhesive Agent 1 of Example 7, and thus a film was prepared in which the three films were laminated. The phase difference of the film was 132.11±1.40 nm (λ=400 nm), 137.22±1.42 nm (λ=550 nm), and 144.96±1.41 nm (λ=800 nm), Re (400 nm)/Re (550 nm) was 0.96, and Re (400 nm)/Re (800 nm) was 0.91. In addition, the total light transmittance was 92.9%, the haze was 0.6%, the reflectance was 7.1%, and the film was a λ/4 wavelength plate having a thickness of 110 μm. Further, in a peeling test using a cross cut method, all 100 pieces of the film had excellent adhesiveness without being peeled off. The results are shown in Table-2.

Comparative Example 1

A polycarbonate-based film, Elmech, manufactured by Kaneka Corporation of which the thickness was 55 μm was fixed in chucks having a distance between the chucks of 70 mm and a width of 70 mm, and was stretched at a stretching temperature of 160° C. and a stretching magnification of 1.2 times, and thus a film having a thickness of 47 μm was obtained. The phase difference of the film was 163.32±1.80 nm (λ=400 nm), 139.59±1.82 nm (λ=550 nm), and 132.61±1.79 nm (λ=800 nm), Re (400 nm)/Re (550 nm) was 1.17, Re (400 nm)/Re (800 nm) was 1.23, the total light transmittance was 90.3%, the haze was 0.7%, and the reflectance was 10.3%. The results are shown in Table-1.

Comparative Example 2

Polymer 6 synthesized in Manufacturing Example 6 was dissolved in cyclohexane at a concentration of 30 mass %, the solution was subjected to pressure filtration using a filter having a hole diameter of 1 μm, and then passed through a filter having a hole diameter of 0.1 μm two times, and was subjected to the multi-stage pressure filtration using a filter having a hole diameter of 0.05 µm, the solution was dried by changing the dry temperature to 120° C., and thus a film having a thickness of 71 µm was prepared by the same method as that in Example 1, and the film was fixed in chucks having a distance between the chucks of 70 mm and a width of 70 mm, and was stretched at a stretching temperature of 115° C. and a stretching magnification of 1.9 times, and thus a film having a thickness of 41 µm was obtained. The phase difference of the film was 152.03±1.66 nm ($\lambda$=400 nm), 138.21±1.69 nm ($\lambda$=550 nm), and 134.52±1.65 nm ($\lambda$=800 nm), Re (400 nm)/Re (550 nm) was 1.10, Re (400 nm)/Re (800 nm) was 1.13, the total light transmittance was 89.7%, the haze was 0.5%, and the reflectance was 9.7%.

Further, two obtained films were laminated through any commercial UV curing adhesive agent, but an adhesive film was not able to be formed. The results are shown in Table-1.

Comparative Example 3

Polymer 7 synthesized in Manufacturing Example 7 was dissolved in methyl isobutyl ketone at a concentration of 30 mass %, the solution was subjected to the pressure filtration using a filter having a hole diameter of 1 µm, and then was subjected to the multi-stage pressure filtration using a filter having a hole diameter of 0.1 µm, and the solution was applied onto a glass substrate, was evenly applied by using an applicator, and then was dried at 100° C. for 30 minutes and was peeled off, and thus a film having a flat and smooth surface of which the thickness was 34.9 µm was obtained. After that, the film was fixed in chucks having a distance between the chucks of 30 mm and a width of 30 mm, and was stretched at a stretching temperature of 189° C. and a stretching magnification of 1.3 times, and thus a film having a thickness of 30 µm was obtained. The phase difference of the film was 6.58±0.70 nm ($\lambda$=400 nm), 6.21±0.73 nm ($\lambda$=550 nm), and 6.08±0.74 nm ($\lambda$=800 nm), Re (400 nm)/Re (550 nm) was 1.06, Re (400 nm)/Re (800 nm) was 1.08, and in a film which was stretched at a stretching magnification of 1.8 times in the same conditions, the thickness after the stretching was 25 µm, the phase difference of the film was 9.36±0.40 nm ($\lambda$=400 nm), 8.83±0.44 nm ($\lambda$=550 nm), and 8.65±0.43 nm ($\lambda$=800 nm), Re (400 nm)/Re (550 nm) was 1.06, and Re (400 nm)/Re (800 nm) was 1.08.

In addition, in a film having a thickness of 18 µm which was stretched at a stretching temperature of 175° C. and a stretching magnification of 3.0 times, the phase difference was 18.18±0.99 nm ($\lambda$=400 nm), 17.15±0.97 nm ($\lambda$=550 nm), and 16.83±0.92 nm ($\lambda$=800 nm), Re (400 nm)/Re (550 nm) was 1.06, and Re (400 nm)/Re (800 nm) was 1.08.

Further, when the stretching was performed by setting the stretching temperature to 165° C. and the stretching magnification to 3.0 times, the film was broken. The results are shown in Table-1.

Comparative Example 4

Polymer 8 synthesized in Manufacturing Example 8 was dissolved in methyl ethyl ketone at a concentration of 30 mass %, the solution was subjected to pressure filtration using a filter having a hole diameter of 1 µm, and then was subjected to the multi-stage pressure filtration using a filter having a hole diameter of 0.1 µm and a filter having a hole diameter of 0.05 µm, and thus a film having a thickness of 63 µm and total light transmittance of 85% which was colored yellow was prepared from a pale yellow solution using a solution casting method by the same method as that in Example 1. Further, the phase difference of a film which was prepared by being stretched at a stretching magnification of 1.7 times by the same method as that in Example 1 was 38.03±0.91 nm ($\lambda$=550 nm), and a film which was stretched at a stretching magnification of 3.0 times was broken. The results are shown in Table-1.

Comparative Example 5

Polymer 1 synthesized in Manufacturing Example 1 was dissolved in methyl ethyl ketone at a concentration of 30 mass %. Next, the same solution as that of Example 1 was applied onto a glass substrate and was evenly applied by using an applicator without performing the fine filtration step. After that, the solution was dried at 100° C. for 30 minutes and was peeled off, and thus a film having a thickness of 65 µm was obtained in which one surface (an atmospheric surface) is in a rough state having concavities and convexities. The average thickness error of 16 points was ±3 µm. After that, the film was fixed in chucks having a distance between the chucks of 70 mm and a width of 70 mm, and was stretched at a stretching temperature of 120° C. and a stretching magnification of 1.7 times, and thus a film having the average thickness of 37 µm was obtained. The phase difference of the film was 135.26±25 nm ($\lambda$=400 nm), 132.61±24 nm ($\lambda$=550 nm), and 132.59±24 nm ($\lambda$=800 nm), Re (400 nm)/Re (550 nm) was 1.02, and Re (400 nm)/Re (800 nm) was 1.02. In addition, the total light transmittance was 89.4%, the haze was 0.9%, the reflectance was 8.1%, and the thickness error due to the surface roughness of the film was extremely large, which was ±5 µm, and thus the film was not suitable as an optical member such as a display. The D ray refractive index is 1.408, the angle of the slow axis with respect to the stretching axis is 0.2°, and the film is a $\lambda$/4 wavelength plate. The results are shown in Table-1.

Comparative Example 6

A stretched film having a thickness of 36 µm in which the phase difference of each of two films prepared by the same method as that in Example 1 was 144.39±1.57 nm ($\lambda$=400 nm), 142.05±1.59 nm ($\lambda$=550 nm), and 141.14±1.54 nm ($\lambda$=800 nm), Re (400 nm)/Re (550 nm) was 1.02, Re (400 nm)/Re (800 nm) was 1.02, and the angle of the slow axis with respect to the stretching axis was 0.1° and a stretched film having a thickness of 36 µm in which the phase difference of the film was 143.09±1.44 nm ($\lambda$=400 nm), 140.85±1.49 nm ($\lambda$=550 nm), and 139.74±1.45 nm ($\lambda$=800 nm), Re (400 nm)/Re (550 nm) was 1.02, Re (400 nm)/Re (800 nm) was 1.02, and the angle of the slow axis with respect to the stretching axis was 0.1° were superposed at an angle of 60° in which the stretching axes of the films intersected each other by changing the adhesive material to Adhesive Agent 3 (a refractive index difference of 0.112), that is, a solution in which 1.0 wt % of a photopolymerization initiator Adekaoptomer SP-172 (manufactured by Adeka Corporation) was added to a composition including 1-phenyl-1,2-epoxy ethane and 3-ethyl-3[{(3-ethyl oxetane-3-yl) methoxy}methyl]oxetane at a mass ratio of 90/10 (a D ray refractive index=1.52), and were subjected to the UV irradiation, and thus a film having a thickness of 75 µm was prepared in which the two stretched films were laminated. The phase difference of the film was 128.88±1.39 nm ($\lambda$=400 nm), 140.09±1.33 nm ($\lambda$=550 nm), and 140.09±1.35 nm ($\lambda$=800 nm), Re (400 nm)/Re (550 nm) was 0.92, Re (400 nm)/Re (800 nm) was 0.92, the total light transmittance was 89.8%, the haze was 0.9%, and the reflectance was 10.2%. The results are shown in Table-2.

Example 11

Polymer 1 synthesized in Manufacturing Example 1 was dissolved in methyl ethyl ketone at a concentration of 30 mass %, the solution was subjected to the pressure filtration using a filter having a hole diameter of 1 μm, and then was subjected to the multi-stage pressure filtration using a filter having a hole diameter of 0.1 μm, a filter having a hole diameter of 0.05 μm, and finally a filter having a hole diameter of 0.02 μm, and thus a methyl ethyl ketone solution was obtained and applied onto a glass substrate, was evenly applied by using an applicator, and then was dried at 100° C. for 30 minutes and was peeled off, and thus a film having a flat and smooth surface of which the thickness was 65 μm was obtained. After that, the film was fixed in chucks having a distance between the chucks of 70 mm and a width of 70 mm, and was stretched at a stretching temperature of 120° C. and a stretching magnification of 1.7 times, and thus a film having a thickness of 36 μm was obtained. The phase difference of the film was 146.91±0.01 nm ($\lambda$=400 nm), 144.10±0.02 nm ($\lambda$=550 nm), and 143.67±0.01 nm ($\lambda$=800 nm), Re (400 nm)/Re (550 nm) was 1.02, and Re (400 nm)/Re (800 nm) was 1.02. In addition, the total light transmittance is 94.5%, the D ray refractive index is 1.408, the haze is 0.2%, the reflectance is 5.5%, the angle of the slow axis with respect to the stretching axis is 0.2°, and the film is a $\lambda$/4 wavelength plate. The results are shown in Table-1.

Example 12

Polymer 3 synthesized in Manufacturing Example 3 was subjected to multi-stage filtration by the same method as that in Example 4, and passed through a filter having a hole diameter of 0.02 μm three times while maintaining a pressure difference ($\Delta P$) between a liquid surface upper portion and a filter lower portion at 0.05 MPa, and thus a trichloromethyl benzene solution of Polymer 3 was obtained and applied onto a glass substrate, was evenly applied by using an applicator, and then was dried at 120° C. for 30 minutes and was peeled off, and thus a film having a flat and smooth surface of which the thickness was 71 μm was obtained. After that, the film was fixed in chucks having a distance between the chucks of 70 mm and a width of 70 mm, and was stretched at a stretching temperature of 155° C. and a stretching magnification of 1.6 times, and thus a film having a thickness of 40 μm was obtained. The phase difference of the film was 144.51±0.01 nm ($\lambda$=400 nm), 144.21±0.01 nm ($\lambda$=550 nm), and 144.05±0.01 nm ($\lambda$=800 nm), Re (400 nm)/Re (550 nm) was 1.00, and Re (400 nm)/Re (800 nm) was 1.00. In addition, the total light transmittance is 95.2%, the D ray refractive index is 1.38, the haze is 0.2%, the reflectance is 4.8%, the angle of the slow axis with respect to the stretching axis is 0.2°, and the film is a $\lambda$/4 wavelength plate. The results are shown in Table-1.

Example 13

Polymer 1 synthesized in Manufacturing Example 1 was subjected to the multi-stage filtration by the same method as that in Example 11, and thus a methyl ethyl ketone solution was obtained and applied onto a glass substrate, and accordingly, a film having a flat and smooth surface of which the thickness was 65 μm was obtained. After that, the width of 70 mm of the film was fixed as a first stretching axis by a chuck having a width of 70 mm, the width of 30 mm of the film was fixed as a second stretching axis by a chuck having a width of 30 mm, and the film was simultaneously biaxially stretched at a stretching temperature of 110° C., the stretching magnification of the first stretching axis of 3.0 times, and the stretching magnification of the second stretching axis of 1.1 times, and thus a film having a thickness of 10 μm was obtained. The phase difference of the film was 142.09±0.02 nm ($\lambda$=400 nm), 139.45±0.01 nm ($\lambda$=550 nm), and 138.91±0.01 nm ($\lambda$=800 nm), Re (400 nm)/Re (550 nm) was 1.02, and Re (400 nm)/Re (800 nm) was 1.02. In addition, the total light transmittance is 94.5%, the D ray refractive index is 1.408, the haze is 0.1%, the reflectance is 1.2%, the angle of the slow axis with respect to the stretching axis is 0.1°, and the film is a $\lambda$/4 wavelength plate. The results are shown in Table-1.

Example 14

Polymer 1 synthesized in Manufacturing Example 1 was subjected to the multi-stage filtration by the same method as that in Example 11, and thus a methyl ethyl ketone solution was obtained and applied onto a glass substrate, and accordingly, a film having a flat and smooth surface of which the thickness was 65 μm was obtained. After that, the width of 70 mm of the film was fixed as a first stretching axis by a chuck having a width of 70 mm, the width of 30 mm of the film was fixed as a second stretching axis by a chuck having a width of 30 mm, and the film was simultaneously biaxially stretched at a stretching temperature of 105° C., the stretching magnification of the first stretching axis of 3.6 times, and the stretching magnification of the second stretching axis of 1.1 times, and thus a film having a thickness of 6 μm was obtained. The phase difference of the film was 289.99±0.02 nm ($\lambda$=400 nm), 280.57±0.01 nm ($\lambda$=550 nm), and 280.22±0.01 nm ($\lambda$=800 nm), Re (400 nm)/Re (550 nm) was 1.03, and Re (400 nm)/Re (800 nm) was 1.03. In addition, the total light transmittance is 94.5%, the D ray refractive index is 1.408, the haze is 0.1%, the reflectance is 0.7%, the angle of the slow axis with respect to the stretching axis is 0.1°, and the film is a $\lambda$/2 wavelength plate. The results are shown in Table-1.

Example 15

A $\lambda$/4 wavelength plate having a thickness of 40 μm in which the phase difference of each of two films prepared from Polymer 1 by the same method as that in Example 11 was 144.51±0.01 nm ($\lambda$=400 nm), 144.21±0.01 nm ($\lambda$=550 nm), and 144.05±0.01 nm ($\lambda$=800 nm), Re (400 nm)/Re (550 nm) was 1.00, Re (400 nm)/Re (800 nm) was 1.00, the total light transmittance was 95.2%, the D ray refractive index was 1.38, the haze was 0.2%, the reflectance was 4.8%, and the angle of the slow axis with respect to the stretching axis was 0.2° and a $\lambda$/4 wavelength plate having a thickness of 40 μm in which the phase difference of the film was 144.50±0.01 nm ($\lambda$=400 nm), 144.20±0.01 nm ($\lambda$=550 nm), and 144.06±0.01 nm ($\lambda$=800 nm), Re (400 nm)/Re (550 nm) was 1.00, Re (400 nm)/Re (800 nm) was 1.00, the total light transmittance was 95.2%, the D ray refractive index was 1.38, the haze was 0.2%, the reflectance was 4.8%, and the angle of the slow axis with respect to the stretching axis was 0.1° were superposed at an angle of 60° in which the stretching axes of the films intersected each other and were adhered to each other through Adhesive Agent 1 by the same method as that in Example 7, and thus a film was prepared in which the two films were laminated. The phase difference of the film was 130.15±0.01 nm (λ=400 nm), 144.61±0.01 nm (λ=550 nm), and 147.89±0.02 nm (λ=800 nm), Re (400 nm)/Re (550 nm) was 0.90, and Re (400 nm)/Re (800 nm) was 0.88. In addition, the total light transmittance was 94.7%, the haze was 0.4%, the reflectance was 5.3%, and thus the film was a λ/4 wavelength plate having a thickness of 80 μm. Further, in a peeling test using a cross cut method, all 100 pieces of the film had excellent adhesiveness without being peeled off. The results are shown in Table-2.

Example 16

A λ/4 wavelength plate having a thickness of 10 μm in which the phase difference of each of two films prepared from Polymer 1 by the same method as that in Example 12 was 142.09±0.02 nm (λ=400 nm), 139.45±0.01 nm (λ=550 nm), and 138.91±0.01 nm (λ=800 nm), Re (400 nm)/Re (550 nm) was 1.02, Re (400 nm)/Re (800 nm) was 1.02, the total light transmittance was 94.5%, the D ray refractive index was 1.408, the haze was 0.1%, the reflectance was 1.2%, and the angle of the slow axis with respect to the stretching axis was 0.1° and a λ/4 wavelength plate having a thickness of 10 μm in which the phase difference of the film was 141.91±0.01 nm (λ=400 nm), 139.17±0.02 nm (λ=550 nm), and 139.54±0.02 nm (λ=800 nm), Re (400 nm)/Re (550 nm) was 1.02, Re (400 nm)/Re (800 nm) was 1.02, the total light transmittance was 94.5%, the D ray refractive index was 1.408, the haze was 0.1%, the reflectance was 1.2%, and the angle of the slow axis with respect to the stretching axis was 0.1° were superposed at an angle of 60° in which the stretching axes of the films intersected each other and were adhered to each other through Adhesive Agent 1 by the same method as that in Example 7, and thus a film was prepared in which the two films were laminated. The phase difference of the film was 130.05±0.01 nm (λ=400 nm), 141.36±0.02 nm (λ=550 nm), and 146.12±0.02 nm (λ=800 nm), Re (400 nm)/Re (550 nm) was 0.92, and Re (400 nm)/Re (800 nm) was 0.89. In addition, the total light transmittance was 92.1%, the haze was 0.2%, the reflectance was 2.4%, and the film was a λ/4 wavelength plate having a thickness of 21 μm. Further, in a peeling test using a cross cut method, all 100 pieces of the film had excellent adhesiveness without being peeled off. The results are shown in Table-2.

Example 17

A λ/2 wavelength plate having a thickness of 6 μm in which the phase difference of each of two films prepared from Polymer 1 by the same method as that in Example 14 was 289.99±0.02 nm (λ=400 nm), 280.57±0.01 nm (λ=550 nm), and 278.84±0.02 nm (λ=800 nm), Re (400 nm)/Re (550 nm) was 1.03, Re (400 nm)/Re (800 nm) was 1.04, the light ray transmittance was 94.5%, the D ray refractive index was 1.408, the haze was 0.1%, the reflectance was 0.7%, and the angle of the slow axis with respect to the stretching axis was 0.1° and a λ/2 wavelength plate having a thickness of 6 μm in which the phase difference of the film was 288.92±0.01 nm (λ=400 nm), 280.50±0.02 nm (λ=550 nm), and 277.81±0.02 nm (λ=800 nm), Re (400 nm)/Re (550 nm) was 1.03, Re (400 nm)/Re (800 nm) was 1.04, the total light transmittance was 94.5%, the D ray refractive index was 1.408, the haze was 0.1%, the reflectance was 0.7%, and the angle of the slow axis with respect to the stretching axis was 0.1° were superposed at an angle of 40° in which the stretching axes of the films intersected each other and were adhered to each other through Adhesive Agent 1 by the same method as that in Example 7, and thus a film was prepared in which the two films were laminated. The phase difference of the film was 222.04±0.02 nm (λ=400 nm), 274.12±0.01 nm (λ=550 nm), and 288.36±0.03 nm (λ=800 nm), Re (400 nm)/Re (550 nm) was 0.81, and Re (400 nm)/Re (800 nm) was 0.77. In addition, the total light transmittance was 93.5%, the haze was 0.2%, the reflectance was 1.4%, and the film was a λ/2 wavelength plate having a thickness of 13 μm. Further, in a peeling test using a cross cut method, all 100 pieces of the film had excellent adhesiveness without being peeled off. The results are shown in Table-2.

TABLE 1

| | | | Physical Properties of Stretched Film | | | | | |
|---|---|---|---|---|---|---|---|---|
| | Hole Diameter of Filter Used in Fine Filtration μm | Phase Difference nm (Wavelength of 550 nm) | Phase Difference Unevenness nm/cm$^2$ (Wavelength of 550 nm) | Re (400 nm)/ Re (550 nm) | Re (400 nm)/ Re (800 nm) | Total Light Transmittance % | Haze % | Reflectance % (Wavelength of 550 nm) |
| Example 1 | 0.1 and 0.05 | 144.09 ± 1.51 | ±0.06 | 1.02 | 1.02 | 95 | 0.3 | 5.5 |
| Example 2 | 0.1 and 0.05 | 279.00 ± 1.70 | ±0.07 | 1.03 | 1.03 | 95 | 0.3 | 5.5 |
| Example 3 | 0.1 and 0.05 | 141.83 ± 1.49 | ±0.06 | 1.02 | 1.02 | 95 | 0.3 | 5.1 |
| Example 4 | 0.1 and 0.05 | 141.05 ± 1.50 | ±0.06 | 1.02 | 1.02 | 95 | 0.3 | 4.8 |
| Example 5 | 0.1 | 140.67 ± 1.27 | ±0.05 | 1.03 | 1.03 | 95 | 0.3 | 6.5 |
| Example 6 | 0.1 and 0.05 | 143.01 ± 1.53 | ±0.06 | 1.02 | 1.02 | 95 | 0.3 | 5.5 |
| Comparative Example 1 | None | 139.59 ± 1.82 | ±0.07 | 1.17 | 1.23 | 90 | 0.7 | 10.3 |
| Comparative Example 2 | 0.1 and 0.05 | 138.21 ± 1.69 | ±0.07 | 1.10 | 1.13 | 90 | 0.5 | 9.7 |
| Comparative Example 3 | 0.1 | 6.21 ± 0.73 | ±0.03 | 1.06 | 1.08 | | | |
| | | 8.83 ± 0.44 | ±0.02 | 1.06 | 1.08 | | | |
| | | 17.15 ± 0.97 | ±0.04 | 1.06 | 1.08 | | | |
| Comparative Example 4 | 0.1 and 0.05 | 38.03 ± 0.91 | ±0.04 | | | | | |
| Comparative Example 5 | None | 132.61 ± 24 | ±0.96 | 1.02 | 1.02 | 89 | 0.9 | 8.1 |
| Example 11 | 0.1, 0.05, and 0.02 | 144.10 ± 0.02 | ±0.00 | 1.02 | 1.02 | 95 | 0.2 | 5.5 |
| Example 12 | 0.1, 0.05, and 0.02 | 144.21 ± 0.01 | ±0.00 | 1.00 | 1.00 | 95 | 0.2 | 4.8 |
| Example 13 | 0.1, 0.05, and 0.02 | 139.45 ± 0.01 | ±0.00 | 1.02 | 1.02 | 95 | 0.1 | 1.2 |
| Example 14 | 0.1, 0.05, and 0.02 | 280.57 ± 0.01 | ±0.00 | 1.03 | 1.03 | 95 | 0.1 | 0.7 |

TABLE 2

|  | Hole Diameter of Filter Used in Fine Filtration μm | Refractive Index Difference between Film and Adhesive Material | Physical Properties of Stretched Film | | | | | | |
|---|---|---|---|---|---|---|---|---|---|
|  |  |  | Phase Difference nm (Wavelength of 550 nm) | Phase Difference Unevenness nm/cm² (Wavelength of 550 nm) | Re (400 nm)/ Re (550 nm) | Re (400 nm)/ Re (800 nm) | Total Light Transmittance % | Haze % | Reflectance % (Wavelength of 550 nm) |
| Example 7 | 0.1 and 0.05 | 0.041 | 141.12 ± 1.38 | ±0.06 | 0.92 | 0.89 | 92 | 0.6 | 7.9 |
| Example 8 | 0.1 and 0.05 | 0.032 | 142.21 ± 1.29 | ±0.05 | 0.91 | 0.88 | 94 | 0.6 | 6.3 |
| Example 9 | 0.1 and 0.05 | 0.041 | 279.96 ± 1.79 | ±0.07 | 0.81 | 0.77 | 94 | 0.6 | 6.5 |
| Example 10 | 0.1 and 0.05 | 0.041 | 137.22 ± 1.42 | ±0.06 | 0.96 | 0.91 | 93 | 0.6 | 7.1 |
| Comparative Example 6 | 0.1 and 0.05 | 0.112 | 140.09 ± 1.33 | ±0.05 | 0.92 | 0.92 | 90 | 0.9 | 10.2 |
| Example 15 | 0.1, 0.05, and 0.02 | 0.041 | 144.61 ± 0.01 | ±0.00 | 0.90 | 0.88 | 95 | 0.4 | 5.3 |
| Example 16 | 0.1, 0.05, and 0.02 | 0.041 | 141.36 ± 0.02 | ±0.00 | 0.92 | 0.89 | 92 | 0.2 | 2.4 |
| Example 17 | 0.1, 0.05, and 0.02 | 0.041 | 274.12 ± 0.01 | ±0.00 | 0.81 | 0.77 | 94 | 0.2 | 1.4 |

The phase difference film of the present invention is able to be preferably used in a display material such as a liquid crystal display, and an organic EL. In particular, reverse wavelength dispersion film is useful to a phase difference film such as a reflective liquid crystal display, and is useful to a polarization plate compensation film, and a polarizer protective film, and thus has an extremely high industrial applicability.

This application claims priority on the basis of Japanese Patent Application No. 2013-077982, filed on Apr. 3, 2013, and the entire disclosure thereof is incorporated herein.

The invention claimed is:

1. An optical film having low wavelength dispersibility which is obtained by stretching a film comprising a fluorine-containing cyclic olefin polymer including at least one selected from a repeating structural unit represented by general formula (1) described below, wherein in the optical film, a phase difference at a wavelength of 550 nm is greater than or equal to 50 nm, wavelength dispersibility represented by a ratio Re (400 nm)/Re (550 nm) of a phase difference Re (400 nm) at a wavelength of 400 nm to a phase difference Re (550 nm) at a wavelength of 550 nm is 1.00 to 1.05, wavelength dispersibility represented by a ratio Re (400 nm)/Re (800 nm) of a phase difference Re (400 nm) at a wavelength of 400 nm to a phase difference Re (800 nm) at a wavelength of 800 nm is 1.00 to 1.05, and total light transmittance is greater than or equal to 92%, wherein the optical film is a stretched phase difference film:

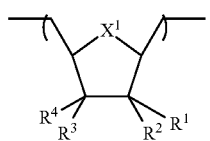

(1)

wherein $X^1$ is selected from —O— and —CH$_2$— and $R^1$ to $R^4$ is selected from fluorine and fluorine-containing alkyl having 1 to 10 carbon atoms, where $R^1$ to $R^4$ may be identical to each other or different from each other, wherein the content rate of the fluorine atom in the formula (1) is 30 mass % to 80 mass %, and wherein the optical film is a λ/4 wavelength plate or a λ/2 wavelength plate.

2. The optical film according to claim 1, obtained by subjecting a varnish of the fluorine-containing cyclic olefin polymer to fine filtration by passing the varnish through a filter including a hole having a hole diameter of less than or equal to 0.5 μm and subsequently forming a film.

3. The optical film according to claim 2, wherein in the λ/4 wavelength plate, a phase difference at a wavelength of 550 nm is 140±10 nm.

4. The optical film according to claim 2, wherein in the λ/2 wavelength plate, a phase difference at a wavelength of 550 nm is 280±20 nm.

5. The optical film according to claim 2, wherein in the λ/4 wavelength plate and the λ/2 wavelength plate, phase difference unevenness at a wavelength of 550 nm is less than or equal to ±0.50 nm/cm².

6. The optical film according to claim 2, wherein in the λ/4 wavelength plate and the λ/2 wavelength plate, reflectance at a wavelength of 550 nm is less than or equal to 7.0%.

7. A laminated optical film obtained by laminating two or more of optical films to each other at an angle in which slow axes are not coaxial, wherein each of said two or more optical films is an optical film having low wavelength dispersibility which is obtained by stretching a film comprising a fluorine-containing cyclic olefin polymer including at least one selected from a repeating structural unit represented by general formula (1) described below, wherein in each of said two or more optical films, a phase difference at a wavelength of 550 nm is greater than or equal to 50 nm, wavelength dispersibility represented by a ratio Re (400 nm)/Re (550 nm) of a phase difference Re (400 nm) at a wavelength of 400 nm to a phase difference Re (550 nm) at a wavelength of 550 nm is 1.00 to 1.05, wavelength dispersibility represented by a ratio Re (400 nm)/Re (800 nm) of a phase difference Re (400 nm) at a wavelength of 400 nm to a phase difference Re (800 nm) at a wavelength of 800 nm is 1.00 to 1.05, and total light transmittance is greater than or equal to 92%, wherein each of said two or more optical films is a stretched phase difference film:

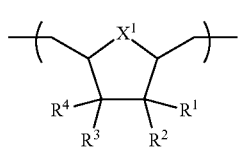

wherein $X^1$ is selected from —O—, —S—, —NR$^5$—, —PR$^5$—, and —CR$^5$R$^6$— wherein R$^5$ and R$^6$ each independently represent hydrogen or alkyl having 1 to 20 carbon atoms, and R$^1$ to R$^4$ is selected from fluorine and fluorine-containing alkyl having 1 to 10 carbon atoms, where R$^1$ to R$^4$ may be identical to each other or different from each other, wherein the content rate of the fluorine atom in the formula (1) is 30 mass % to 80 mass %, wherein each of said two or more optical films is a λ/4 wavelength plate or a λ/2 wavelength plate, and wherein reverse wavelength dispersibility Re (400 nm)/Re (550 nm of the laminated optical film) is less than 1.00, and total light transmittance of the laminated optical film is greater than or equal to 91%.

8. The optical film according to claim 7,
wherein two or more of the optical films are laminated through an adhesive material of which a refractive index difference (Δn) with respect to the optical film is less than or equal to 0.1.

9. The laminated optical film according to claim 7, wherein each of the two or more optical films is obtained by subjecting a varnish of the fluorine-containing cyclic olefin polymer to fine filtration by passing the varnish through a filter including a hole having a hole diameter of less than or equal to 0.5 μm
and subsequently forming a film.

10. The laminated optical film according to claim 9,
wherein in the λ/4 wavelength plate, a phase difference at a wavelength of 550 nm is 140±10 nm.

11. The laminated optical film according to claim 9,
wherein in the λ/2 wavelength plate, a phase difference at a wavelength of 550 nm is 280±20 nm.

12. The laminated optical film according to claim 9,
wherein in the λ/4 wavelength plate and the λ/2 wavelength plate, phase difference unevenness at a wavelength of 550 nm is less than or equal to ±0.50 nm/cm$^2$.

13. The laminated optical film according to claim 9,
wherein in the λ/4 wavelength plate and the λ/2 wavelength plate, reflectance at a wavelength of 550 nm is less than or equal to 7.0%.

14. A laminated optical film obtained by laminating two or more of optical films to each other at an angle in which slow axes are not coaxial,
wherein reverse wavelength dispersibility Re (400 nm)/Re (550 nm) of the laminated optical film is less than 1.00, and total light transmittance is greater than or equal to 91% of said laminated optical films, and
wherein each of said two or more optical films is obtained by stretching a film comprising a fluorine-containing cyclic olefin polymer including at least one selected from a repeating structural unit represented by general formula (1) described below,
wherein in each of said two or more optical films, a phase difference at a wavelength of 550 nm is greater than or equal to 50 nm, wavelength dispersibility represented by a ratio Re (400 nm)/Re (550 nm) of a phase difference Re (400 nm) at a wavelength of 400 nm to a phase difference Re (550 nm) at a wavelength of 550 nm is 1.00 to 1.05, wavelength dispersibility represented by a ratio Re (400 nm)/Re (800 nm) of a phase difference Re (400 nm) at a wavelength of 400 nm to a phase difference Re (800 nm) at a wavelength of 800 nm is 1.00 to 1.05, and total light transmittance is greater than or equal to 92%:

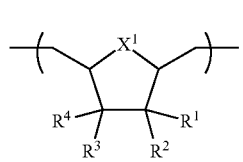

wherein at least one of R$^1$ to R$^4$ is selected from fluorine, fluorine-containing alkyl having 1 to 10 carbon atoms, fluorine-containing alkoxy having 1 to 10 carbon atoms, fluorine-containing alkoxy alkyl having 2 to 10 carbon atoms, fluorine-containing aryl having 6 to 20 carbon atoms, fluorine-containing alkoxy carbonyl having 2 to 10 carbon atoms, fluorine-containing aryloxy carbonyl having 7 to 20 carbon atoms, fluorine-containing alkoxy carbonyl alkyl having 3 to 10 carbon atoms, and fluorine-containing aryloxy carbonyl alkyl having 8 to 20 carbon atoms, where R$^1$ to R$^4$ may be identical to each other or different from each other, when R$^1$ to R$^4$ are groups other than fluorine or the substituent groups described above, R$^1$ to R$^4$ are each independently selected from hydrogen, alkyl having 1 to 10 carbon atoms, aryl having 6 to 20 carbon atoms, alkoxy having 1 to 10 carbon atoms, alkoxy alkyl having 2 to 10 carbon atoms, alkoxy carbonyl having 2 to 10 carbon atoms, aryloxy carbonyl having 7 to 20 carbon atoms, alkoxy carbonyl alkyl having 3 to 10 carbon atoms, or aryloxy carbonyl alkyl having 8 to 20 carbon atoms, and X$^1$ is selected from —O—, —S—, —NR$^5$—, —PR$^5$—, and —CR$^5$R$^6$— wherein R$^5$ and R$^6$ each independently representing hydrogen or alkyl having 1 to 20 carbon atoms.

15. The laminated optical film according to claim 14,
wherein two or more of the optical films are laminated through an adhesive material of which a refractive index difference (Δn) with respect to the optical film is less than or equal to 0.1.

16. The laminated optical film according to claim 14,
wherein the optical film is a λ/4 wavelength plate or a λ/2 wavelength plate.

17. The laminated optical film according to claim 16,
wherein each of the two or more optical films is obtained by subjecting a varnish of the fluorine-containing cyclic olefin polymer to fine filtration by passing the varnish through a filter including a hole having a hole diameter of less than or equal to 0.5 μm
and subsequently forming a film, wherein the optical film is a λ/4 wavelength plate or a λ/2 wavelength plate.

18. The laminated optical film according to claim 17,
wherein in the λ/4 wavelength plate, a phase difference at a wavelength of 550 nm is 140±10 nm.

19. The laminated optical film according to claim 17,
wherein in the λ/2 wavelength plate, a phase difference at a wavelength of 550 nm is 280±20 nm.

20. The laminated optical film according to claim 17, wherein in the λ/4 wavelength plate and the λ/2 wavelength plate, phase difference unevenness at a wavelength of 550 nm is less than or equal to ±0.50 nm/cm².

21. The laminated optical film according to claim 17, wherein in the λ/4 wavelength plate and the λ/2 wavelength plate, reflectance at a wavelength of 550 nm is less than or equal to 7.0%.

* * * * *